(12) United States Patent
McCarriar et al.

(10) Patent No.: US 10,616,179 B1
(45) Date of Patent: Apr. 7, 2020

(54) SELECTIVE ROUTING OF DOMAIN NAME SYSTEM (DNS) REQUESTS

(71) Applicant: Amazon Technologies, Inc., Seattle, WA (US)

(72) Inventors: Daniel Lee McCarriar, Arlington, VA (US); Andrew Charles Wantuch, Centreville, VA (US); Leonardo Lizcano, Madrid (ES); Steven Hunton Ngo, Silver Spring, MD (US); Xin Liu, Bellevue, WA (US); Kyle Benjamin Schultheiss, Centreville, VA (US); Lee-Ming Zen, Seattle, WA (US); Yu Gu, Bellevue, WA (US); Fan Xiang, Seattle, WA (US); Yohanes Santoso, Sterling, VA (US)

(73) Assignee: Amazon Technologies, Inc., Seattle, WA (US)

( * ) Notice: Subject to any disclaimer, the term of this patent is extended or adjusted under 35 U.S.C. 154(b) by 487 days.

(21) Appl. No.: 14/750,698

(22) Filed: Jun. 25, 2015

(51) Int. Cl.
*H04L 29/12* (2006.01)

(52) U.S. Cl.
CPC ...... *H04L 61/2514* (2013.01); *H04L 61/1511* (2013.01)

(58) Field of Classification Search
CPC .......................... H04L 61/1511; H04L 61/2514
See application file for complete search history.

(56) References Cited

U.S. PATENT DOCUMENTS

| | | |
|---|---|---|
| 5,063,500 A | 11/1991 | Shorter |
| 5,341,477 A | 8/1994 | Pitkin et al. |
| 5,459,837 A | 10/1995 | Caccavale |
| 5,611,049 A | 3/1997 | Pitts |
| 5,649,185 A | 7/1997 | Antognini et al. |
| 5,701,467 A | 12/1997 | Freeston |
| 5,764,910 A | 6/1998 | Shachar |
| 5,774,660 A | 6/1998 | Brendel et al. |
| 5,852,717 A | 12/1998 | Bhide et al. |
| 5,892,914 A | 4/1999 | Pitts |
| 5,893,116 A | 4/1999 | Simmonds et al. |
| 5,895,462 A | 4/1999 | Toki |
| 5,933,811 A | 8/1999 | Angles et al. |
| 5,937,427 A | 8/1999 | Shinagawa et al. |
| 5,974,454 A | 10/1999 | Apfel et al. |
| 5,991,306 A | 11/1999 | Burns et al. |

(Continued)

FOREIGN PATENT DOCUMENTS

| | | |
|---|---|---|
| CA | 2741 895 A1 | 5/2010 |
| CN | 1422468 A | 6/2003 |

(Continued)

OTHER PUBLICATIONS

Office Action in Japanese Application No. 2014-225580 dated Oct. 3, 2016.

(Continued)

*Primary Examiner* — Azizul Choudhury
(74) *Attorney, Agent, or Firm* — Klarquist Sparkman, LLP

(57) ABSTRACT

Domain Name System (DNS) requests can be routed to either a private DNS server or a public DNS server based on a determination made by a DNS classifier. The private DNS server allows customers to use custom DNS names for internal resources without exposing the names or IP addresses to the public Internet.

17 Claims, 10 Drawing Sheets

(56) References Cited

U.S. PATENT DOCUMENTS

| | | |
|---|---|---|
| 5,999,274 A | 12/1999 | Lee et al. |
| 6,016,512 A | 1/2000 | Huitema |
| 6,026,452 A | 2/2000 | Pitts |
| 6,038,601 A | 3/2000 | Lambert et al. |
| 6,052,718 A | 4/2000 | Gifford |
| 6,078,960 A | 6/2000 | Ballard |
| 6,085,234 A | 7/2000 | Pitts et al. |
| 6,092,100 A | 7/2000 | Berstis et al. |
| 6,098,096 A | 8/2000 | Tsirigotis et al. |
| 6,108,703 A | 8/2000 | Leighton et al. |
| 6,128,279 A | 10/2000 | O'Neil et al. |
| 6,151,631 A | 11/2000 | Ansell et al. |
| 6,157,942 A | 12/2000 | Chu et al. |
| 6,167,438 A | 12/2000 | Yates et al. |
| 6,167,446 A | 12/2000 | Lister et al. |
| 6,173,316 B1 | 1/2001 | De Boor et al. |
| 6,182,111 B1 | 1/2001 | Inohara et al. |
| 6,182,125 B1 | 1/2001 | Borella et al. |
| 6,185,598 B1 | 2/2001 | Farber et al. |
| 6,192,051 B1 | 2/2001 | Lipman et al. |
| 6,205,475 B1 | 3/2001 | Pitts |
| 6,223,288 B1 | 4/2001 | Byrne |
| 6,243,761 B1 | 6/2001 | Mogul et al. |
| 6,275,496 B1 | 8/2001 | Burns et al. |
| 6,286,043 B1 | 9/2001 | Cuomo et al. |
| 6,286,084 B1 | 9/2001 | Wexler et al. |
| 6,304,913 B1 | 10/2001 | Rune |
| 6,324,580 B1 | 11/2001 | Jindal et al. |
| 6,330,602 B1 | 12/2001 | Law et al. |
| 6,338,082 B1 | 1/2002 | Schneider |
| 6,345,308 B1 | 2/2002 | Abe |
| 6,351,743 B1 | 2/2002 | DeArdo et al. |
| 6,351,775 B1 | 2/2002 | Yu |
| 6,363,411 B1 | 3/2002 | Dugan et al. |
| 6,366,952 B2 | 4/2002 | Pitts |
| 6,374,290 B1 | 4/2002 | Scharber et al. |
| 6,377,257 B1 | 4/2002 | Borrel et al. |
| 6,386,043 B1 | 5/2002 | Millins |
| 6,405,252 B1 | 6/2002 | Gupta et al. |
| 6,408,360 B1 | 6/2002 | Chamberlain et al. |
| 6,411,967 B1 | 6/2002 | Van Renesse |
| 6,415,280 B1 | 7/2002 | Farber et al. |
| 6,430,607 B1 | 8/2002 | Kavner |
| 6,438,592 B1 | 8/2002 | Killian |
| 6,442,165 B1 | 8/2002 | Sitaraman et al. |
| 6,452,925 B1 | 9/2002 | Sistanizadeh et al. |
| 6,457,047 B1 | 9/2002 | Chandra et al. |
| 6,459,909 B1 | 10/2002 | Bilcliff et al. |
| 6,473,804 B1 | 10/2002 | Kaiser et al. |
| 6,484,143 B1 | 11/2002 | Swildens et al. |
| 6,484,161 B1 | 11/2002 | Chipalkatti et al. |
| 6,493,765 B1 | 12/2002 | Cunningham et al. |
| 6,505,241 B2 | 1/2003 | Pitts |
| 6,523,036 B1 | 2/2003 | Hickman et al. |
| 6,529,910 B1 | 3/2003 | Fleskes |
| 6,529,953 B1 | 3/2003 | Van Renesse |
| 6,553,413 B1 | 4/2003 | Leighton et al. |
| 6,560,610 B1 | 5/2003 | Eatherton et al. |
| 6,611,873 B1 | 8/2003 | Kanehara |
| 6,622,168 B1 | 9/2003 | Datta |
| 6,633,324 B2 | 10/2003 | Stephens, Jr. |
| 6,643,357 B2 | 11/2003 | Lumsden |
| 6,643,707 B1 | 11/2003 | Booth |
| 6,654,807 B2 | 11/2003 | Farber et al. |
| 6,658,462 B1 | 12/2003 | Dutta |
| 6,665,706 B2 | 12/2003 | Kenner et al. |
| 6,678,717 B1 | 1/2004 | Schneider |
| 6,678,791 B1 | 1/2004 | Jacobs et al. |
| 6,681,282 B1 | 1/2004 | Golden et al. |
| 6,694,358 B1 | 2/2004 | Swildens et al. |
| 6,697,805 B1 | 2/2004 | Choquier et al. |
| 6,724,770 B1 | 4/2004 | Van Renesse |
| 6,732,237 B1 | 5/2004 | Jacobs et al. |
| 6,754,699 B2 | 6/2004 | Swildens et al. |
| 6,754,706 B1 | 6/2004 | Swildens et al. |
| 6,760,721 B1 | 7/2004 | Chasen et al. |
| 6,769,031 B1 | 7/2004 | Bero |
| 6,782,398 B1 | 8/2004 | Bahl |
| 6,785,704 B1 | 8/2004 | McCanne |
| 6,795,434 B1 | 9/2004 | Kumar et al. |
| 6,799,214 B1 | 9/2004 | Li |
| 6,804,706 B2 | 10/2004 | Pitts |
| 6,810,291 B2 | 10/2004 | Card et al. |
| 6,810,411 B1 | 10/2004 | Coughlin et al. |
| 6,829,654 B1 | 12/2004 | Jungck |
| 6,862,607 B1 | 3/2005 | Vermeulen |
| 6,868,439 B2 | 3/2005 | Basu et al. |
| 6,874,017 B1 | 3/2005 | Inoue et al. |
| 6,917,951 B2 | 7/2005 | Orbits et al. |
| 6,928,467 B2 | 8/2005 | Peng et al. |
| 6,928,485 B2 | 8/2005 | Krishnamurthy et al. |
| 6,941,562 B2 | 9/2005 | Gao et al. |
| 6,963,850 B1 | 11/2005 | Bezos et al. |
| 6,976,090 B2 | 12/2005 | Ben-Shaul et al. |
| 6,981,017 B1 | 12/2005 | Kasriel et al. |
| 6,985,945 B2 | 1/2006 | Farhat et al. |
| 6,986,018 B2 | 1/2006 | O'Rourke et al. |
| 6,990,526 B1 | 1/2006 | Zhu |
| 6,996,616 B1 | 2/2006 | Leighton et al. |
| 7,003,555 B1 | 2/2006 | Jungck |
| 7,006,099 B2 | 2/2006 | Gut et al. |
| 7,007,089 B2 | 2/2006 | Freedman |
| 7,009,943 B2 | 3/2006 | O'Neil |
| 7,010,578 B1 | 3/2006 | Lewin et al. |
| 7,010,598 B2 | 3/2006 | Sitaraman et al. |
| 7,023,465 B2 | 4/2006 | Stephens, Jr. |
| 7,024,466 B2 | 4/2006 | Outten et al. |
| 7,031,445 B2 | 4/2006 | Lumsden |
| 7,032,010 B1 | 4/2006 | Swildens et al. |
| 7,058,633 B1 | 6/2006 | Gnagy et al. |
| 7,058,706 B1 | 6/2006 | Iyer et al. |
| 7,058,953 B2 | 6/2006 | Willard et al. |
| 7,065,496 B2 | 6/2006 | Subbloie et al. |
| 7,065,587 B2 | 6/2006 | Huitema et al. |
| 7,072,982 B2 | 7/2006 | Teodosiu et al. |
| 7,076,633 B2 | 7/2006 | Tormasov et al. |
| 7,082,476 B1 | 7/2006 | Cohen et al. |
| 7,086,061 B1 | 8/2006 | Joshi et al. |
| 7,092,505 B2 | 8/2006 | Allison et al. |
| 7,092,997 B1 | 8/2006 | Kasriel et al. |
| 7,096,193 B1 | 8/2006 | Beaudoin et al. |
| 7,096,266 B2 | 8/2006 | Lewin et al. |
| 7,099,936 B2 | 8/2006 | Chase et al. |
| 7,103,645 B2 | 9/2006 | Leighton et al. |
| 7,114,160 B2 | 9/2006 | Suryanarayana et al. |
| 7,117,262 B2 | 10/2006 | Bai et al. |
| 7,120,874 B2 | 10/2006 | Shah et al. |
| 7,133,905 B2 | 11/2006 | Dilley et al. |
| 7,136,922 B2 | 11/2006 | Sundaram et al. |
| 7,139,808 B2 | 11/2006 | Anderson et al. |
| 7,139,821 B1 | 11/2006 | Shah et al. |
| 7,143,169 B1 | 11/2006 | Champagne et al. |
| 7,143,170 B2 | 11/2006 | Swildens et al. |
| 7,146,560 B2 | 12/2006 | Dang et al. |
| 7,149,809 B2 | 12/2006 | Barde et al. |
| 7,152,118 B2 | 12/2006 | Anderson, IV et al. |
| 7,162,539 B2 | 1/2007 | Garcie-Luna-Aceves |
| 7,174,382 B2 | 2/2007 | Ramanathan et al. |
| 7,185,063 B1 | 2/2007 | Kasriel et al. |
| 7,185,084 B2 | 2/2007 | Sirivara et al. |
| 7,188,214 B1 | 3/2007 | Kasriel et al. |
| 7,194,522 B1 | 3/2007 | Swildens et al. |
| 7,194,552 B1 | 3/2007 | Schneider |
| 7,200,667 B2 | 4/2007 | Teodosiu et al. |
| 7,216,170 B2 | 5/2007 | Ludvig et al. |
| 7,225,254 B1 | 5/2007 | Swildens et al. |
| 7,228,350 B2 | 6/2007 | Hong et al. |
| 7,228,359 B1 | 6/2007 | Monteiro |
| 7,233,978 B2 | 6/2007 | Overton et al. |
| 7,240,100 B1 | 7/2007 | Wein et al. |
| 7,249,196 B1 | 7/2007 | Peiffer et al. |
| 7,251,675 B1 | 7/2007 | Kamakura et al. |
| 7,254,626 B1 | 8/2007 | Kommula et al. |
| 7,254,636 B1 | 8/2007 | O'Toole, Jr. et al. |

(56) References Cited

U.S. PATENT DOCUMENTS

| | | |
|---|---|---|
| 7,257,581 B1 | 8/2007 | Steele et al. |
| 7,260,598 B1 | 8/2007 | Liskov et al. |
| 7,260,639 B2 | 8/2007 | Afergan et al. |
| 7,269,784 B1 | 9/2007 | Kasriel et al. |
| 7,272,227 B1 | 9/2007 | Beran |
| 7,274,658 B2 | 9/2007 | Bornstein et al. |
| 7,289,519 B1 | 10/2007 | Liskov |
| 7,293,093 B2 | 11/2007 | Leighton |
| 7,308,499 B2 | 12/2007 | Chavez |
| 7,310,686 B2 | 12/2007 | Uysal |
| 7,316,648 B2 | 1/2008 | Kelly et al. |
| 7,318,074 B2 | 1/2008 | Iyengar et al. |
| 7,320,131 B1 | 1/2008 | O'Toole, Jr. |
| 7,321,918 B2 | 1/2008 | Burd et al. |
| 7,339,937 B2 | 3/2008 | Mitra et al. |
| 7,340,505 B2 | 3/2008 | Lisiecki et al. |
| 7,363,291 B1 | 4/2008 | Page |
| 7,363,626 B2 | 4/2008 | Koutharapu et al. |
| 7,370,089 B2 | 5/2008 | Boyd et al. |
| 7,373,416 B2 | 5/2008 | Kagan et al. |
| 7,376,736 B2 | 5/2008 | Sundaram et al. |
| 7,380,078 B2 | 5/2008 | Ikegaya et al. |
| 7,392,236 B2 | 6/2008 | Rusch et al. |
| 7,398,301 B2 | 7/2008 | Hennessey et al. |
| 7,406,512 B2 | 7/2008 | Swildens et al. |
| 7,406,522 B2 | 7/2008 | Riddle |
| 7,430,610 B2 | 9/2008 | Pace et al. |
| 7,441,045 B2 | 10/2008 | Skene et al. |
| 7,441,261 B2 | 10/2008 | Slater et al. |
| 7,454,457 B1 | 11/2008 | Lowery et al. |
| 7,454,500 B1 | 11/2008 | Hsu et al. |
| 7,461,170 B1 | 12/2008 | Taylor et al. |
| 7,464,142 B2 | 12/2008 | Flurry et al. |
| 7,478,148 B2 | 1/2009 | Neerdaels |
| 7,492,720 B2 | 2/2009 | Pruthi et al. |
| 7,496,651 B1 | 2/2009 | Joshi |
| 7,499,998 B2 | 3/2009 | Toebes et al. |
| 7,502,836 B1 | 3/2009 | Menditto et al. |
| 7,505,464 B2 | 3/2009 | Okmianski et al. |
| 7,519,720 B2 | 4/2009 | Fishman et al. |
| 7,519,726 B2 | 4/2009 | Palliyil et al. |
| 7,523,181 B2 | 4/2009 | Swildens et al. |
| 7,543,024 B2 | 6/2009 | Holstege |
| 7,548,947 B2 | 6/2009 | Kasriel et al. |
| 7,552,235 B2 | 6/2009 | Chase et al. |
| 7,555,542 B1 | 6/2009 | Ayers et al. |
| 7,561,571 B1 | 7/2009 | Lovett et al. |
| 7,565,407 B1 | 7/2009 | Hayball |
| 7,568,032 B2 | 7/2009 | Feng et al. |
| 7,573,916 B1 | 8/2009 | Bechtolsheim et al. |
| 7,574,499 B1 | 8/2009 | Swildens et al. |
| 7,581,009 B1 | 8/2009 | Hsu et al. |
| 7,594,189 B1 | 9/2009 | Walker et al. |
| 7,596,619 B2 | 9/2009 | Leighton et al. |
| 7,617,222 B2 | 11/2009 | Coulthard et al. |
| 7,623,460 B2 | 11/2009 | Miyazaki |
| 7,624,169 B2 | 11/2009 | Lisiecki et al. |
| 7,631,101 B2 | 12/2009 | Sullivan et al. |
| 7,640,296 B2 | 12/2009 | Fuchs et al. |
| 7,650,376 B1 | 1/2010 | Blumenau |
| 7,653,700 B1 | 1/2010 | Bahl et al. |
| 7,653,725 B2 | 1/2010 | Yahiro et al. |
| 7,657,613 B1 | 2/2010 | Hanson et al. |
| 7,657,622 B1 | 2/2010 | Douglis et al. |
| 7,661,027 B2 | 2/2010 | Langen et al. |
| 7,664,831 B2 | 2/2010 | Cartmell et al. |
| 7,664,879 B2 | 2/2010 | Chan et al. |
| 7,676,570 B2 | 3/2010 | Levy et al. |
| 7,680,897 B1 | 3/2010 | Carter et al. |
| 7,685,251 B2 | 3/2010 | Houlihan et al. |
| 7,693,813 B1 | 4/2010 | Cao et al. |
| 7,693,959 B2 | 4/2010 | Leighton et al. |
| 7,702,724 B1 | 4/2010 | Brydon et al. |
| 7,706,740 B2 | 4/2010 | Collins et al. |
| 7,707,071 B2 | 4/2010 | Rigole |
| 7,707,173 B2 | 4/2010 | Nanavati et al. |
| 7,707,314 B2 | 4/2010 | McCarthy et al. |
| 7,711,647 B2 | 5/2010 | Gunaseelan et al. |
| 7,711,788 B2 | 5/2010 | Lev Ran et al. |
| 7,716,367 B1 | 5/2010 | Leighton et al. |
| 7,725,602 B2 | 5/2010 | Liu et al. |
| 7,730,187 B2 | 6/2010 | Raciborski et al. |
| 7,739,400 B2 | 6/2010 | Lindbo et al. |
| 7,747,720 B2 | 6/2010 | Toebes et al. |
| 7,756,913 B1 | 7/2010 | Day |
| 7,756,965 B2 | 7/2010 | Joshi |
| 7,757,202 B2 | 7/2010 | Dahlsted et al. |
| 7,761,572 B1 | 7/2010 | Auerbach |
| 7,765,304 B2 | 7/2010 | Davis et al. |
| 7,769,823 B2 | 8/2010 | Jenny et al. |
| 7,773,596 B1 | 8/2010 | Marques |
| 7,774,342 B1 | 8/2010 | Virdy |
| 7,783,727 B1 | 8/2010 | Foley et al. |
| 7,787,380 B1 | 8/2010 | Aggarwal et al. |
| 7,792,989 B2 | 9/2010 | Toebes et al. |
| 7,805,516 B2 | 9/2010 | Kettler et al. |
| 7,809,597 B2 | 10/2010 | Das et al. |
| 7,813,308 B2 | 10/2010 | Reddy et al. |
| 7,814,229 B1 | 10/2010 | Cabrera et al. |
| 7,818,454 B2 | 10/2010 | Kim et al. |
| 7,827,256 B2 | 11/2010 | Phillips et al. |
| 7,836,177 B2 | 11/2010 | Kasriel et al. |
| 7,853,719 B1 | 12/2010 | Cao et al. |
| 7,865,594 B1 | 1/2011 | Baumback et al. |
| 7,865,953 B1 | 1/2011 | Hsieh et al. |
| 7,873,065 B1 | 1/2011 | Mukerji et al. |
| 7,890,612 B2 | 2/2011 | Todd et al. |
| 7,899,899 B2 | 3/2011 | Joshi |
| 7,904,875 B2 | 3/2011 | Hegyi |
| 7,912,921 B2 | 3/2011 | O'Rourke et al. |
| 7,925,782 B2 | 4/2011 | Sivasubramanian et al. |
| 7,930,393 B1 | 4/2011 | Baumback et al. |
| 7,930,402 B2 | 4/2011 | Swildens et al. |
| 7,930,427 B2 | 4/2011 | Josefsberg et al. |
| 7,933,988 B2 | 4/2011 | Nasuto et al. |
| 7,937,456 B2 | 5/2011 | McGrath |
| 7,937,477 B1 | 5/2011 | Day et al. |
| 7,945,693 B2 | 5/2011 | Farber et al. |
| 7,949,779 B2 | 5/2011 | Farber et al. |
| 7,958,222 B1 | 6/2011 | Pruitt et al. |
| 7,958,258 B2 | 6/2011 | Yeung et al. |
| 7,961,736 B2 | 6/2011 | Ayyagari |
| 7,962,597 B2 | 6/2011 | Richardson et al. |
| 7,966,404 B2 | 6/2011 | Hedin et al. |
| 7,970,816 B2 | 6/2011 | Chess et al. |
| 7,970,940 B1 | 6/2011 | van de Ven et al. |
| 7,979,509 B1 | 7/2011 | Malmskog et al. |
| 7,991,910 B2 | 8/2011 | Richardson et al. |
| 7,996,533 B2 | 8/2011 | Leighton et al. |
| 7,996,535 B2 | 8/2011 | Auerbach |
| 8,000,724 B1 | 8/2011 | Rayburn et al. |
| 8,010,707 B2 | 8/2011 | Elzur et al. |
| 8,019,869 B2 | 9/2011 | Kriegsman |
| 8,024,441 B2 | 9/2011 | Kommula et al. |
| 8,028,090 B2 | 9/2011 | Richardson et al. |
| 8,041,773 B2 | 10/2011 | Abu-Ghazaleh et al. |
| 8,041,809 B2 | 10/2011 | Sundaram et al. |
| 8,041,818 B2 | 10/2011 | Gupta et al. |
| 8,042,054 B2 | 10/2011 | White et al. |
| 8,051,166 B1 | 11/2011 | Baumback et al. |
| 8,065,275 B2 | 11/2011 | Eriksen et al. |
| 8,069,231 B2 | 11/2011 | Schran et al. |
| 8,073,940 B1 | 12/2011 | Richardson et al. |
| 8,082,348 B1 | 12/2011 | Averbuj et al. |
| 8,108,623 B2 | 1/2012 | Krishnaprasad et al. |
| 8,117,306 B1 | 2/2012 | Baumback et al. |
| 8,122,098 B1 | 2/2012 | Richardson et al. |
| 8,122,124 B1 | 2/2012 | Baumback et al. |
| 8,132,242 B1 | 3/2012 | Wu |
| 8,135,820 B2 | 3/2012 | Richardson et al. |
| 8,156,243 B2 | 4/2012 | Richardson et al. |
| 8,175,863 B1 | 5/2012 | Ostermeyer et al. |
| 8,190,682 B2 | 5/2012 | Paterson-Jones et al. |
| 8,195,837 B2 | 6/2012 | McCarthy et al. |

(56) References Cited

U.S. PATENT DOCUMENTS

| | | |
|---|---|---|
| 8,224,986 B1 | 7/2012 | Liskov et al. |
| 8,224,994 B1 | 7/2012 | Schneider |
| 8,234,403 B2 | 7/2012 | Richardson et al. |
| 8,239,530 B2 | 8/2012 | Sundaram et al. |
| 8,250,135 B2 | 8/2012 | Driesen et al. |
| 8,250,211 B2 | 8/2012 | Swildens et al. |
| 8,250,219 B2 | 8/2012 | Raciborski et al. |
| 8,266,288 B2 | 9/2012 | Banerjee et al. |
| 8,266,327 B2 | 9/2012 | Kumar et al. |
| 8,271,471 B1 | 9/2012 | Kamvar et al. |
| 8,280,998 B2 | 10/2012 | Joshi |
| 8,281,035 B2 | 10/2012 | Farber et al. |
| 8,286,176 B1 | 10/2012 | Baumback et al. |
| 8,291,046 B2 | 10/2012 | Farber et al. |
| 8,291,117 B1 | 10/2012 | Eggleston et al. |
| 8,296,429 B2 | 10/2012 | Baumback et al. |
| 8,301,645 B1 | 10/2012 | Crook |
| 8,321,568 B2 | 11/2012 | Sivasubramanian et al. |
| 8,331,370 B2 | 12/2012 | Hamilton et al. |
| 8,402,137 B2 | 3/2013 | Sivasuramanian et al. |
| 8,423,408 B1 | 4/2013 | Barnes et al. |
| 8,433,749 B2 | 4/2013 | Wee et al. |
| 8,447,876 B2 | 5/2013 | Verma et al. |
| 8,452,745 B2 | 5/2013 | Ramakrishna |
| 8,452,874 B2 | 5/2013 | MacCarthaigh et al. |
| 8,463,877 B1 | 6/2013 | Richardson |
| 8,468,222 B2 | 6/2013 | Sakata et al. |
| 8,468,245 B2 | 6/2013 | Farber et al. |
| 8,473,613 B2 | 6/2013 | Farber et al. |
| 8,478,903 B2 | 7/2013 | Farber et al. |
| 8,504,721 B2 | 8/2013 | Hsu et al. |
| 8,510,428 B2 | 8/2013 | Joshi |
| 8,510,807 B1 | 8/2013 | Elazary et al. |
| 8,521,851 B1 | 8/2013 | Richardson et al. |
| 8,521,880 B1 | 8/2013 | Richardson et al. |
| 8,521,908 B2 | 8/2013 | Holmes et al. |
| 8,526,405 B2 | 9/2013 | Curtis et al. |
| 8,527,639 B1 | 9/2013 | Liskov et al. |
| 8,527,658 B2 | 9/2013 | Holmes et al. |
| 8,572,208 B2 | 10/2013 | Farber et al. |
| 8,572,210 B2 | 10/2013 | Farber et al. |
| 8,577,992 B1 | 11/2013 | Richardson et al. |
| 8,589,996 B2 | 11/2013 | Ma et al. |
| 8,606,996 B2 | 12/2013 | Richardson et al. |
| 8,612,565 B2 | 12/2013 | Schneider |
| 8,615,549 B2 | 12/2013 | Knowles et al. |
| 8,626,950 B1 | 1/2014 | Richardson et al. |
| 8,635,340 B1 | 1/2014 | Schneider |
| 8,639,817 B2 | 1/2014 | Sivasubramanian et al. |
| 8,645,539 B2 | 2/2014 | McCarthy et al. |
| 8,676,918 B2 | 3/2014 | Richardson et al. |
| 8,683,076 B2 | 3/2014 | Farber et al. |
| 8,688,837 B1 | 4/2014 | Richardson et al. |
| 8,712,950 B2 | 4/2014 | Smith et al. |
| 8,732,309 B1 | 5/2014 | Richardson et al. |
| 8,745,177 B1 | 6/2014 | Kazerani et al. |
| 8,756,322 B1 | 6/2014 | Lynch |
| 8,756,325 B2 | 6/2014 | Sivasubramanian et al. |
| 8,756,341 B1 | 6/2014 | Richardson et al. |
| 8,782,236 B1 | 7/2014 | Marshall et al. |
| 8,782,279 B2 | 7/2014 | Eggleston et al. |
| 8,819,283 B2 | 8/2014 | Richardson et al. |
| 8,902,897 B2 | 12/2014 | Hamilton et al. |
| 8,914,514 B1 | 12/2014 | Jenkins et al. |
| 8,924,528 B1 | 12/2014 | Richardson et al. |
| 8,930,513 B1 | 1/2015 | Richardson et al. |
| 8,930,544 B2 | 1/2015 | Richardson et al. |
| 8,938,526 B1 | 1/2015 | Richardson et al. |
| 8,966,318 B1 | 2/2015 | Shah |
| 8,971,328 B2 | 3/2015 | Judge et al. |
| 9,003,035 B1 | 4/2015 | Richardson et al. |
| 9,009,286 B2 | 4/2015 | Sivasubramanian et al. |
| 9,009,334 B1 | 4/2015 | Jenkins et al. |
| 9,021,127 B2 | 4/2015 | Richardson et al. |
| 9,021,128 B2 | 4/2015 | Sivasubramanian et al. |
| 9,021,129 B2 | 4/2015 | Richardson et al. |
| 9,026,616 B2 | 5/2015 | Sivasubramanian et al. |
| 9,037,975 B1 | 5/2015 | Taylor et al. |
| 9,071,502 B2 | 6/2015 | Baumback et al. |
| 9,075,893 B1 | 7/2015 | Jenkins |
| 9,083,675 B2 | 7/2015 | Richardson et al. |
| 9,083,743 B1 | 7/2015 | Patel et al. |
| 9,106,701 B2 | 8/2015 | Richardson et al. |
| 9,130,756 B2 | 9/2015 | Richardson et al. |
| 9,137,302 B1 | 9/2015 | Makhijani et al. |
| 9,154,551 B1 | 10/2015 | Watson |
| 9,160,703 B2 | 10/2015 | Richardson et al. |
| 9,172,674 B1 | 10/2015 | Patel et al. |
| 9,176,894 B2 | 11/2015 | Marshall et al. |
| 9,185,012 B2 | 11/2015 | Richardson et al. |
| 9,191,338 B2 | 11/2015 | Richardson et al. |
| 9,191,458 B2 | 11/2015 | Richardson et al. |
| 9,195,996 B1 | 11/2015 | Walsh et al. |
| 9,208,097 B2 | 12/2015 | Richardson et al. |
| 9,210,099 B2 | 12/2015 | Baumback et al. |
| 9,210,235 B2 | 12/2015 | Sivasubramanian et al. |
| 9,237,114 B2 | 1/2016 | Richardson et al. |
| 9,240,954 B1 | 1/2016 | Ellsworth et al. |
| 9,246,776 B2 | 1/2016 | Ellsworth et al. |
| 9,251,112 B2 | 2/2016 | Richardson et al. |
| 9,253,065 B2 | 2/2016 | Richardson et al. |
| 9,282,032 B2 | 3/2016 | Judge et al. |
| 9,294,391 B1 | 3/2016 | Mostert |
| 9,323,577 B2 | 4/2016 | Marr et al. |
| 9,332,078 B2 | 5/2016 | Sivasubramanian et al. |
| 9,444,759 B2 | 9/2016 | Richardson et al. |
| 9,479,476 B2 | 10/2016 | Richardson et al. |
| 9,495,338 B1 | 11/2016 | Hollis et al. |
| 9,497,259 B1 | 11/2016 | Richardson et al. |
| 9,515,949 B2 | 12/2016 | Richardson et al. |
| 9,525,659 B1 | 12/2016 | Sonkin et al. |
| 9,544,394 B2 | 1/2017 | Richardson et al. |
| 9,628,554 B2 | 4/2017 | Marshall et al. |
| 9,705,922 B2 * | 7/2017 | Foxhoven ............... H04L 63/20 |
| 9,712,325 B2 | 7/2017 | Richardson et al. |
| 9,712,484 B1 | 7/2017 | Richardson et al. |
| 9,734,472 B2 | 8/2017 | Richardson et al. |
| 9,742,795 B1 | 8/2017 | Radlein et al. |
| 2001/0000811 A1 | 5/2001 | May et al. |
| 2001/0025305 A1 | 9/2001 | Yoshiasa et al. |
| 2001/0032133 A1 | 10/2001 | Moran |
| 2001/0034704 A1 | 10/2001 | Farhat et al. |
| 2001/0049741 A1 | 12/2001 | Skene et al. |
| 2001/0052016 A1 | 12/2001 | Skene et al. |
| 2001/0056416 A1 | 12/2001 | Garcia-Luna-Aceves |
| 2001/0056500 A1 | 12/2001 | Farber et al. |
| 2002/0002613 A1 | 1/2002 | Freeman et al. |
| 2002/0004846 A1 | 1/2002 | Garcia-Luna-Aceves et al. |
| 2002/0007413 A1 | 1/2002 | Garcia-Luna-Aceves et al. |
| 2002/0010783 A1 | 1/2002 | Primak et al. |
| 2002/0010798 A1 | 1/2002 | Ben-Shaul et al. |
| 2002/0048269 A1 | 4/2002 | Hong et al. |
| 2002/0049608 A1 | 4/2002 | Hartsell et al. |
| 2002/0049857 A1 | 4/2002 | Farber et al. |
| 2002/0052942 A1 | 5/2002 | Swildens et al. |
| 2002/0062372 A1 | 5/2002 | Hong et al. |
| 2002/0068554 A1 | 6/2002 | Dusse |
| 2002/0069420 A1 | 6/2002 | Russell et al. |
| 2002/0078233 A1 | 6/2002 | Biliris et al. |
| 2002/0082858 A1 | 6/2002 | Heddaya et al. |
| 2002/0083118 A1 | 6/2002 | Sim |
| 2002/0083148 A1 | 6/2002 | Shaw et al. |
| 2002/0083178 A1 | 6/2002 | Brothers |
| 2002/0087374 A1 | 7/2002 | Boubez et al. |
| 2002/0091786 A1 | 7/2002 | Yamaguchi et al. |
| 2002/0091801 A1 | 7/2002 | Lewin |
| 2002/0092026 A1 | 7/2002 | Janniello et al. |
| 2002/0099616 A1 | 7/2002 | Sweldens |
| 2002/0099850 A1 | 7/2002 | Farber et al. |
| 2002/0101836 A1 | 8/2002 | Dorenbosch |
| 2002/0103820 A1 | 8/2002 | Cartmell et al. |
| 2002/0103972 A1 | 8/2002 | Satran et al. |
| 2002/0107944 A1 | 8/2002 | Bai et al. |
| 2002/0112049 A1 | 8/2002 | Elnozahy et al. |

(56) References Cited

U.S. PATENT DOCUMENTS

| | | |
|---|---|---|
| 2002/0116481 A1 | 8/2002 | Lee |
| 2002/0116491 A1 | 8/2002 | Boyd et al. |
| 2002/0116582 A1 | 8/2002 | Copeland et al. |
| 2002/0120782 A1 | 8/2002 | Dillon et al. |
| 2002/0124047 A1 | 9/2002 | Gartner et al. |
| 2002/0124098 A1 | 9/2002 | Shaw |
| 2002/0129123 A1 | 9/2002 | Johnson et al. |
| 2002/0131428 A1 | 9/2002 | Pecus et al. |
| 2002/0133741 A1 | 9/2002 | Maeda et al. |
| 2002/0135611 A1 | 9/2002 | Deosaran et al. |
| 2002/0138286 A1 | 9/2002 | Engstrom |
| 2002/0138437 A1 | 9/2002 | Lewin et al. |
| 2002/0138443 A1 | 9/2002 | Schran et al. |
| 2002/0143675 A1 | 10/2002 | Orshan |
| 2002/0143989 A1 | 10/2002 | Huitema et al. |
| 2002/0145993 A1 | 10/2002 | Chowdhury et al. |
| 2002/0147770 A1 | 10/2002 | Tang |
| 2002/0147774 A1 | 10/2002 | Lisiecki et al. |
| 2002/0150094 A1 | 10/2002 | Cheng et al. |
| 2002/0152326 A1 | 10/2002 | Orshan |
| 2002/0154157 A1 | 10/2002 | Sherr et al. |
| 2002/0156911 A1 | 10/2002 | Croman et al. |
| 2002/0161745 A1 | 10/2002 | Call |
| 2002/0161767 A1 | 10/2002 | Shapiro et al. |
| 2002/0163882 A1 | 11/2002 | Bornstein et al. |
| 2002/0165912 A1 | 11/2002 | Wenocur et al. |
| 2002/0169890 A1 | 11/2002 | Beaumont et al. |
| 2002/0184368 A1 | 12/2002 | Wang |
| 2002/0188722 A1 | 12/2002 | Banerjee et al. |
| 2002/0194324 A1 | 12/2002 | Guha |
| 2002/0194382 A1 | 12/2002 | Kausik et al. |
| 2002/0198953 A1 | 12/2002 | O'Rourke et al. |
| 2003/0002484 A1 | 1/2003 | Freedman |
| 2003/0007482 A1 | 1/2003 | Khello et al. |
| 2003/0009591 A1 | 1/2003 | Hayball et al. |
| 2003/0026410 A1 | 2/2003 | Lumsden |
| 2003/0028642 A1 | 2/2003 | Agarwal et al. |
| 2003/0033283 A1 | 2/2003 | Evans et al. |
| 2003/0037139 A1 | 2/2003 | Shteyn |
| 2003/0041094 A1 | 2/2003 | Lara et al. |
| 2003/0046343 A1 | 3/2003 | Krishnamurthy et al. |
| 2003/0065739 A1 | 4/2003 | Shnier |
| 2003/0074401 A1 | 4/2003 | Connell et al. |
| 2003/0074471 A1 | 4/2003 | Anderson et al. |
| 2003/0079027 A1 | 4/2003 | Slocombe et al. |
| 2003/0093523 A1 | 5/2003 | Cranor et al. |
| 2003/0099202 A1 | 5/2003 | Lear et al. |
| 2003/0099237 A1 | 5/2003 | Mitra et al. |
| 2003/0101278 A1 | 5/2003 | Garcia-Luna-Aceves et al. |
| 2003/0112792 A1 | 6/2003 | Cranor et al. |
| 2003/0120741 A1 | 6/2003 | Wu et al. |
| 2003/0133554 A1 | 7/2003 | Nykanen et al. |
| 2003/0135467 A1 | 7/2003 | Okamoto |
| 2003/0135509 A1 | 7/2003 | Davis et al. |
| 2003/0140087 A1 | 7/2003 | Lincoln et al. |
| 2003/0145038 A1 | 7/2003 | Tariq et al. |
| 2003/0145066 A1 | 7/2003 | Okada et al. |
| 2003/0149581 A1 | 8/2003 | Chaudhri et al. |
| 2003/0154239 A1 | 8/2003 | Davis et al. |
| 2003/0154284 A1 | 8/2003 | Bernardin et al. |
| 2003/0163722 A1 | 8/2003 | Anderson, IV |
| 2003/0172145 A1 | 9/2003 | Nguyen |
| 2003/0172183 A1 | 9/2003 | Anderson, IV et al. |
| 2003/0172291 A1 | 9/2003 | Judge et al. |
| 2003/0174648 A1 | 9/2003 | Wang et al. |
| 2003/0182305 A1 | 9/2003 | Balva et al. |
| 2003/0182413 A1 | 9/2003 | Allen et al. |
| 2003/0182447 A1 | 9/2003 | Schilling |
| 2003/0187935 A1 | 10/2003 | Agarwalla et al. |
| 2003/0187970 A1 | 10/2003 | Chase et al. |
| 2003/0191822 A1 | 10/2003 | Leighton et al. |
| 2003/0200394 A1 | 10/2003 | Ashmore et al. |
| 2003/0204602 A1 | 10/2003 | Hudson et al. |
| 2003/0229682 A1 | 12/2003 | Day |
| 2003/0233423 A1 | 12/2003 | Dilley et al. |
| 2003/0233445 A1 | 12/2003 | Levy et al. |
| 2003/0233455 A1 | 12/2003 | Leber et al. |
| 2003/0236700 A1 | 12/2003 | Arning et al. |
| 2003/0236779 A1 | 12/2003 | Choi et al. |
| 2004/0003032 A1 | 1/2004 | Ma et al. |
| 2004/0010563 A1 | 1/2004 | Forte et al. |
| 2004/0010588 A1 | 1/2004 | Slater et al. |
| 2004/0010621 A1 | 1/2004 | Afergan et al. |
| 2004/0015584 A1 | 1/2004 | Cartmell et al. |
| 2004/0019518 A1 | 1/2004 | Abraham et al. |
| 2004/0024841 A1 | 2/2004 | Becker et al. |
| 2004/0030620 A1 | 2/2004 | Benjamin et al. |
| 2004/0034744 A1 | 2/2004 | Karlsson et al. |
| 2004/0039798 A1 | 2/2004 | Hotz et al. |
| 2004/0044731 A1 | 3/2004 | Chen et al. |
| 2004/0044791 A1 | 3/2004 | Pouzzner |
| 2004/0049579 A1 | 3/2004 | Ims et al. |
| 2004/0059805 A1 | 3/2004 | Dinker et al. |
| 2004/0064335 A1 | 4/2004 | Yang |
| 2004/0064501 A1 | 4/2004 | Jan et al. |
| 2004/0068542 A1 | 4/2004 | Lalonde et al. |
| 2004/0073596 A1 | 4/2004 | Kloninger et al. |
| 2004/0073707 A1 | 4/2004 | Dillon |
| 2004/0073867 A1 | 4/2004 | Kausik et al. |
| 2004/0078468 A1 | 4/2004 | Hedin et al. |
| 2004/0078487 A1 | 4/2004 | Cernohous et al. |
| 2004/0083283 A1 | 4/2004 | Sundaram et al. |
| 2004/0083307 A1 | 4/2004 | Uysal |
| 2004/0117455 A1 | 6/2004 | Kaminksy et al. |
| 2004/0128344 A1 | 7/2004 | Trossen |
| 2004/0128346 A1 | 7/2004 | Melamed et al. |
| 2004/0139230 A1* | 7/2004 | Kim ............... H04L 29/06027 709/245 |
| 2004/0167981 A1 | 8/2004 | Douglas et al. |
| 2004/0167982 A1 | 8/2004 | Cohen et al. |
| 2004/0172466 A1 | 9/2004 | Douglas et al. |
| 2004/0194085 A1 | 9/2004 | Beaubien et al. |
| 2004/0194102 A1 | 9/2004 | Neerdaels |
| 2004/0203630 A1 | 10/2004 | Wang |
| 2004/0205149 A1 | 10/2004 | Dillon et al. |
| 2004/0205162 A1 | 10/2004 | Parikh |
| 2004/0215823 A1 | 10/2004 | Kleinfelter et al. |
| 2004/0221019 A1 | 11/2004 | Swildens et al. |
| 2004/0221034 A1 | 11/2004 | Kausik et al. |
| 2004/0246948 A1 | 12/2004 | Lee et al. |
| 2004/0249939 A1 | 12/2004 | Amini et al. |
| 2004/0249971 A1 | 12/2004 | Klinker |
| 2004/0249975 A1 | 12/2004 | Tuck et al. |
| 2004/0250119 A1 | 12/2004 | Shelest et al. |
| 2004/0254921 A1 | 12/2004 | Cohen et al. |
| 2004/0267906 A1 | 12/2004 | Truty |
| 2004/0267907 A1 | 12/2004 | Gustafsson |
| 2005/0010653 A1 | 1/2005 | McCanne |
| 2005/0021706 A1 | 1/2005 | Maggi et al. |
| 2005/0021862 A1 | 1/2005 | Schroeder et al. |
| 2005/0027882 A1 | 2/2005 | Sullivan et al. |
| 2005/0038967 A1 | 2/2005 | Umbehocker et al. |
| 2005/0044270 A1 | 2/2005 | Grove et al. |
| 2005/0086645 A1 | 4/2005 | Diao et al. |
| 2005/0102683 A1 | 5/2005 | Branson et al. |
| 2005/0108169 A1 | 5/2005 | Balasubramanian et al. |
| 2005/0108529 A1 | 5/2005 | Juneau |
| 2005/0114296 A1 | 5/2005 | Farber et al. |
| 2005/0117717 A1 | 6/2005 | Lumsden |
| 2005/0132083 A1 | 6/2005 | Raciborski et al. |
| 2005/0147088 A1 | 7/2005 | Bao et al. |
| 2005/0157712 A1 | 7/2005 | Rangarajan et al. |
| 2005/0160133 A1 | 7/2005 | Greenlee et al. |
| 2005/0163168 A1 | 7/2005 | Sheth et al. |
| 2005/0168782 A1 | 8/2005 | Kobashi et al. |
| 2005/0171959 A1 | 8/2005 | Deforche et al. |
| 2005/0181769 A1 | 8/2005 | Kogawa |
| 2005/0188073 A1 | 8/2005 | Nakamichi et al. |
| 2005/0192008 A1 | 9/2005 | Desai et al. |
| 2005/0198170 A1 | 9/2005 | LeMay et al. |
| 2005/0198334 A1 | 9/2005 | Farber et al. |
| 2005/0198571 A1 | 9/2005 | Kramer et al. |
| 2005/0216569 A1 | 9/2005 | Coppola et al. |
| 2005/0216674 A1 | 9/2005 | Robbin et al. |

(56) References Cited

U.S. PATENT DOCUMENTS

| | | |
|---|---|---|
| 2005/0228856 A1 | 10/2005 | Swildens et al. |
| 2005/0229119 A1 | 10/2005 | Torvinen |
| 2005/0232165 A1 | 10/2005 | Brawn et al. |
| 2005/0240574 A1 | 10/2005 | Challenger et al. |
| 2005/0259645 A1 | 11/2005 | Chen et al. |
| 2005/0259672 A1 | 11/2005 | Eduri |
| 2005/0262248 A1 | 11/2005 | Jennings, III et al. |
| 2005/0267937 A1 | 12/2005 | Daniels et al. |
| 2005/0267991 A1 | 12/2005 | Huitema et al. |
| 2005/0267992 A1 | 12/2005 | Huitema et al. |
| 2005/0267993 A1 | 12/2005 | Huitema et al. |
| 2005/0278259 A1 | 12/2005 | Gunaseelan et al. |
| 2005/0283759 A1 | 12/2005 | Peteanu et al. |
| 2005/0283784 A1 | 12/2005 | Suzuki |
| 2006/0013158 A1 | 1/2006 | Ahuja et al. |
| 2006/0020596 A1 | 1/2006 | Liu et al. |
| 2006/0020684 A1 | 1/2006 | Mukherjee et al. |
| 2006/0020714 A1 | 1/2006 | Girouard et al. |
| 2006/0020715 A1 | 1/2006 | Jungck |
| 2006/0021001 A1 | 1/2006 | Giles et al. |
| 2006/0026067 A1 | 2/2006 | Nicholas et al. |
| 2006/0026154 A1 | 2/2006 | Altinel et al. |
| 2006/0031239 A1 | 2/2006 | Koenig |
| 2006/0031319 A1 | 2/2006 | Nelson et al. |
| 2006/0031503 A1 | 2/2006 | Gilbert |
| 2006/0034494 A1 | 2/2006 | Holloran |
| 2006/0036720 A1 | 2/2006 | Faulk, Jr. |
| 2006/0036966 A1 | 2/2006 | Yevdayev |
| 2006/0037037 A1 | 2/2006 | Miranz |
| 2006/0039352 A1 | 2/2006 | Karstens |
| 2006/0041614 A1 | 2/2006 | Oe |
| 2006/0047787 A1 | 3/2006 | Aggarwal et al. |
| 2006/0047813 A1 | 3/2006 | Aggarwal et al. |
| 2006/0059246 A1 | 3/2006 | Grove |
| 2006/0063534 A1 | 3/2006 | Kokkonen et al. |
| 2006/0064476 A1 | 3/2006 | Decasper et al. |
| 2006/0064500 A1 | 3/2006 | Roth et al. |
| 2006/0074750 A1 | 4/2006 | Clark et al. |
| 2006/0075084 A1 | 4/2006 | Lyon |
| 2006/0075139 A1 | 4/2006 | Jungck |
| 2006/0083165 A1 | 4/2006 | McLane et al. |
| 2006/0085536 A1 | 4/2006 | Meyer et al. |
| 2006/0088026 A1 | 4/2006 | Mazur et al. |
| 2006/0112066 A1 | 5/2006 | Hamzy |
| 2006/0112176 A1 | 5/2006 | Liu et al. |
| 2006/0120385 A1 | 6/2006 | Atchison et al. |
| 2006/0129665 A1 | 6/2006 | Toebes et al. |
| 2006/0136453 A1 | 6/2006 | Kwan |
| 2006/0143293 A1 | 6/2006 | Freedman |
| 2006/0146820 A1 | 7/2006 | Friedman et al. |
| 2006/0146870 A1* | 7/2006 | Harvey ............ H04L 29/12009 370/466 |
| 2006/0149529 A1 | 7/2006 | Nguyen et al. |
| 2006/0155823 A1 | 7/2006 | Tran et al. |
| 2006/0155862 A1 | 7/2006 | Kathi et al. |
| 2006/0161541 A1 | 7/2006 | Cencini |
| 2006/0165051 A1 | 7/2006 | Banerjee et al. |
| 2006/0168088 A1 | 7/2006 | Leighton et al. |
| 2006/0173957 A1 | 8/2006 | Robinson |
| 2006/0179080 A1 | 8/2006 | Meek et al. |
| 2006/0184936 A1 | 8/2006 | Abels et al. |
| 2006/0190605 A1 | 8/2006 | Franz et al. |
| 2006/0193247 A1 | 8/2006 | Naseh et al. |
| 2006/0195866 A1 | 8/2006 | Thukral |
| 2006/0206568 A1 | 9/2006 | Verma et al. |
| 2006/0206586 A1 | 9/2006 | Ling et al. |
| 2006/0209701 A1 | 9/2006 | Zhang et al. |
| 2006/0218265 A1 | 9/2006 | Farber et al. |
| 2006/0218304 A1 | 9/2006 | Mukherjee et al. |
| 2006/0224752 A1 | 10/2006 | Parekh et al. |
| 2006/0227740 A1 | 10/2006 | McLaughlin et al. |
| 2006/0227758 A1 | 10/2006 | Rana et al. |
| 2006/0230137 A1 | 10/2006 | Gare et al. |
| 2006/0233155 A1 | 10/2006 | Srivastava |
| 2006/0253546 A1 | 11/2006 | Chang et al. |
| 2006/0253609 A1 | 11/2006 | Andreev et al. |
| 2006/0259581 A1 | 11/2006 | Piersol |
| 2006/0259690 A1 | 11/2006 | Vittal et al. |
| 2006/0259984 A1 | 11/2006 | Juneau |
| 2006/0265497 A1 | 11/2006 | Ohata et al. |
| 2006/0265508 A1 | 11/2006 | Angel et al. |
| 2006/0265516 A1 | 11/2006 | Schilling |
| 2006/0265720 A1 | 11/2006 | Cai et al. |
| 2006/0271641 A1 | 11/2006 | Stavrakos et al. |
| 2006/0282522 A1 | 12/2006 | Lewin et al. |
| 2006/0288119 A1 | 12/2006 | Kim et al. |
| 2007/0005689 A1 | 1/2007 | Leighton et al. |
| 2007/0005801 A1 | 1/2007 | Kumar et al. |
| 2007/0005892 A1 | 1/2007 | Mullender et al. |
| 2007/0011267 A1 | 1/2007 | Overton et al. |
| 2007/0014241 A1 | 1/2007 | Banerjee et al. |
| 2007/0021998 A1 | 1/2007 | Laithwaite et al. |
| 2007/0028001 A1 | 2/2007 | Phillips et al. |
| 2007/0038729 A1 | 2/2007 | Sullivan et al. |
| 2007/0038994 A1 | 2/2007 | Davis et al. |
| 2007/0041393 A1 | 2/2007 | Westhead et al. |
| 2007/0043859 A1 | 2/2007 | Ruul |
| 2007/0050522 A1 | 3/2007 | Grove et al. |
| 2007/0050703 A1 | 3/2007 | Lebel |
| 2007/0055764 A1 | 3/2007 | Dilley et al. |
| 2007/0061440 A1 | 3/2007 | Sundaram et al. |
| 2007/0076872 A1 | 4/2007 | Juneau |
| 2007/0086429 A1 | 4/2007 | Lawrence et al. |
| 2007/0094361 A1 | 4/2007 | Hoynowski et al. |
| 2007/0101061 A1 | 5/2007 | Baskaran et al. |
| 2007/0101377 A1 | 5/2007 | Six et al. |
| 2007/0118667 A1 | 5/2007 | McCarthy et al. |
| 2007/0118668 A1 | 5/2007 | McCarthy et al. |
| 2007/0134641 A1 | 6/2007 | Lieu |
| 2007/0156919 A1 | 7/2007 | Potti et al. |
| 2007/0162331 A1 | 7/2007 | Sullivan |
| 2007/0168517 A1 | 7/2007 | Weller |
| 2007/0174426 A1 | 7/2007 | Swildens et al. |
| 2007/0174442 A1 | 7/2007 | Sherman et al. |
| 2007/0174490 A1 | 7/2007 | Choi et al. |
| 2007/0183342 A1 | 8/2007 | Wong et al. |
| 2007/0198982 A1 | 8/2007 | Bolan et al. |
| 2007/0204107 A1 | 8/2007 | Greenfield et al. |
| 2007/0208737 A1 | 9/2007 | Li et al. |
| 2007/0219795 A1 | 9/2007 | Park et al. |
| 2007/0220010 A1 | 9/2007 | Ertugrul |
| 2007/0233705 A1 | 10/2007 | Farber et al. |
| 2007/0233706 A1 | 10/2007 | Farber et al. |
| 2007/0233846 A1 | 10/2007 | Farber et al. |
| 2007/0233884 A1 | 10/2007 | Farber et al. |
| 2007/0244964 A1 | 10/2007 | Challenger et al. |
| 2007/0245010 A1 | 10/2007 | Arn et al. |
| 2007/0245022 A1 | 10/2007 | Olliphant et al. |
| 2007/0250467 A1 | 10/2007 | Mesnik et al. |
| 2007/0250560 A1 | 10/2007 | Wein et al. |
| 2007/0250601 A1 | 10/2007 | Amlekar et al. |
| 2007/0250611 A1 | 10/2007 | Bhogal et al. |
| 2007/0253377 A1 | 11/2007 | Janneteau et al. |
| 2007/0255843 A1 | 11/2007 | Zubev |
| 2007/0263604 A1 | 11/2007 | Tal |
| 2007/0266113 A1 | 11/2007 | Koopmans et al. |
| 2007/0266311 A1 | 11/2007 | Westphal |
| 2007/0266333 A1 | 11/2007 | Cossey et al. |
| 2007/0270165 A1 | 11/2007 | Poosala |
| 2007/0271375 A1 | 11/2007 | Hwang |
| 2007/0271385 A1 | 11/2007 | Davis et al. |
| 2007/0271560 A1 | 11/2007 | Wahlert et al. |
| 2007/0271608 A1 | 11/2007 | Shimizu et al. |
| 2007/0280229 A1 | 12/2007 | Kenney |
| 2007/0288588 A1 | 12/2007 | Wein et al. |
| 2007/0291739 A1 | 12/2007 | Sullivan et al. |
| 2008/0005057 A1 | 1/2008 | Ozzie et al. |
| 2008/0008089 A1 | 1/2008 | Bornstein et al. |
| 2008/0016233 A1 | 1/2008 | Schneider |
| 2008/0025304 A1 | 1/2008 | Venkataswami et al. |
| 2008/0037536 A1 | 2/2008 | Padmanabhan et al. |
| 2008/0046550 A1 | 2/2008 | Mazur et al. |
| 2008/0046596 A1 | 2/2008 | Afergan et al. |
| 2008/0056207 A1 | 3/2008 | Eriksson et al. |

(56) References Cited

U.S. PATENT DOCUMENTS

| | | |
|---|---|---|
| 2008/0065724 A1 | 3/2008 | Seed et al. |
| 2008/0065745 A1 | 3/2008 | Leighton et al. |
| 2008/0071859 A1 | 3/2008 | Seed et al. |
| 2008/0071987 A1 | 3/2008 | Karn et al. |
| 2008/0072264 A1 | 3/2008 | Crayford |
| 2008/0082551 A1 | 4/2008 | Farber et al. |
| 2008/0082662 A1 | 4/2008 | Dandliker et al. |
| 2008/0086559 A1 | 4/2008 | Davis et al. |
| 2008/0086574 A1 | 4/2008 | Raciborski et al. |
| 2008/0092242 A1 | 4/2008 | Rowley |
| 2008/0101358 A1* | 5/2008 | Van Ewijk ........ H04L 29/12132 370/389 |
| 2008/0103805 A1 | 5/2008 | Shear et al. |
| 2008/0104268 A1 | 5/2008 | Farber et al. |
| 2008/0114829 A1 | 5/2008 | Button et al. |
| 2008/0125077 A1 | 5/2008 | Velazquez et al. |
| 2008/0126706 A1 | 5/2008 | Newport et al. |
| 2008/0134043 A1 | 6/2008 | Georgis et al. |
| 2008/0140800 A1 | 6/2008 | Farber et al. |
| 2008/0147866 A1 | 6/2008 | Stolorz et al. |
| 2008/0147873 A1 | 6/2008 | Matsumoto |
| 2008/0155059 A1 | 6/2008 | Hardin et al. |
| 2008/0155061 A1 | 6/2008 | Afergan et al. |
| 2008/0155613 A1 | 6/2008 | Benya et al. |
| 2008/0155614 A1 | 6/2008 | Cooper et al. |
| 2008/0159312 A1* | 7/2008 | Tuononen ........ H04L 29/12367 370/401 |
| 2008/0162667 A1 | 7/2008 | Verma et al. |
| 2008/0162821 A1 | 7/2008 | Duran et al. |
| 2008/0162843 A1 | 7/2008 | Davis et al. |
| 2008/0172488 A1 | 7/2008 | Jawahar et al. |
| 2008/0183721 A1 | 7/2008 | Bhogal et al. |
| 2008/0189437 A1 | 8/2008 | Halley |
| 2008/0201332 A1 | 8/2008 | Souders et al. |
| 2008/0215718 A1 | 9/2008 | Stolorz et al. |
| 2008/0215730 A1 | 9/2008 | Sundaram et al. |
| 2008/0215735 A1 | 9/2008 | Farber et al. |
| 2008/0215747 A1 | 9/2008 | Menon et al. |
| 2008/0215750 A1 | 9/2008 | Farber et al. |
| 2008/0215755 A1 | 9/2008 | Farber et al. |
| 2008/0222281 A1 | 9/2008 | Dilley et al. |
| 2008/0222291 A1 | 9/2008 | Weller et al. |
| 2008/0222295 A1 | 9/2008 | Robinson et al. |
| 2008/0228574 A1 | 9/2008 | Stewart et al. |
| 2008/0228920 A1 | 9/2008 | Souders et al. |
| 2008/0235400 A1 | 9/2008 | Slocombe et al. |
| 2008/0256175 A1 | 10/2008 | Lee et al. |
| 2008/0263135 A1 | 10/2008 | Olliphant |
| 2008/0275772 A1 | 11/2008 | Suryanarayana et al. |
| 2008/0281946 A1 | 11/2008 | Swildens et al. |
| 2008/0281950 A1 | 11/2008 | Wald et al. |
| 2008/0288722 A1 | 11/2008 | Lecoq et al. |
| 2008/0301670 A1 | 12/2008 | Gouge et al. |
| 2008/0312766 A1 | 12/2008 | Couckuyt |
| 2008/0319862 A1 | 12/2008 | Golan et al. |
| 2008/0320123 A1 | 12/2008 | Houlihan et al. |
| 2008/0320269 A1 | 12/2008 | Houlihan et al. |
| 2009/0013063 A1 | 1/2009 | Soman |
| 2009/0016236 A1 | 1/2009 | Alcala et al. |
| 2009/0029644 A1 | 1/2009 | Sue et al. |
| 2009/0031367 A1 | 1/2009 | Sue |
| 2009/0031368 A1 | 1/2009 | Ling |
| 2009/0031376 A1 | 1/2009 | Riley et al. |
| 2009/0049098 A1 | 2/2009 | Pickelsimer et al. |
| 2009/0063038 A1 | 3/2009 | Shrivathsan et al. |
| 2009/0063704 A1 | 3/2009 | Taylor et al. |
| 2009/0070533 A1 | 3/2009 | Elazary et al. |
| 2009/0083228 A1 | 3/2009 | Shatz et al. |
| 2009/0083279 A1 | 3/2009 | Hasek |
| 2009/0086741 A1 | 4/2009 | Zhang |
| 2009/0089869 A1 | 4/2009 | Varghese |
| 2009/0103707 A1 | 4/2009 | McGary et al. |
| 2009/0106381 A1 | 4/2009 | Kasriel et al. |
| 2009/0112703 A1 | 4/2009 | Brown |
| 2009/0125393 A1 | 5/2009 | Hwang et al. |
| 2009/0125934 A1 | 5/2009 | Jones et al. |
| 2009/0132368 A1 | 5/2009 | Cotter et al. |
| 2009/0132648 A1 | 5/2009 | Swildens et al. |
| 2009/0138533 A1 | 5/2009 | Iwasaki et al. |
| 2009/0144411 A1 | 6/2009 | Winkler et al. |
| 2009/0144412 A1 | 6/2009 | Ferguson et al. |
| 2009/0150926 A1 | 6/2009 | Schlack |
| 2009/0157850 A1 | 6/2009 | Gagliardi et al. |
| 2009/0158163 A1 | 6/2009 | Stephens et al. |
| 2009/0164331 A1 | 6/2009 | Bishop et al. |
| 2009/0164614 A1 | 6/2009 | Christian et al. |
| 2009/0177667 A1 | 7/2009 | Ramos et al. |
| 2009/0182815 A1 | 7/2009 | Czechowski et al. |
| 2009/0182837 A1 | 7/2009 | Rogers |
| 2009/0182945 A1 | 7/2009 | Aviles et al. |
| 2009/0187575 A1 | 7/2009 | DaCosta |
| 2009/0204682 A1 | 8/2009 | Jeyaseelan et al. |
| 2009/0210549 A1 | 8/2009 | Hudson et al. |
| 2009/0233623 A1 | 9/2009 | Johnson |
| 2009/0241167 A1 | 9/2009 | Moore |
| 2009/0248697 A1 | 10/2009 | Richardson et al. |
| 2009/0248786 A1 | 10/2009 | Richardson et al. |
| 2009/0248787 A1 | 10/2009 | Sivasubramanian et al. |
| 2009/0248852 A1 | 10/2009 | Fuhrmann et al. |
| 2009/0248858 A1 | 10/2009 | Sivasubramanian et al. |
| 2009/0248893 A1 | 10/2009 | Richardson et al. |
| 2009/0249222 A1 | 10/2009 | Schmidt et al. |
| 2009/0253435 A1 | 10/2009 | Olofsson |
| 2009/0254661 A1 | 10/2009 | Fullagar et al. |
| 2009/0259971 A1 | 10/2009 | Rankine et al. |
| 2009/0271498 A1 | 10/2009 | Cable |
| 2009/0271577 A1 | 10/2009 | Campana et al. |
| 2009/0271730 A1 | 10/2009 | Rose et al. |
| 2009/0279444 A1 | 11/2009 | Ravindran et al. |
| 2009/0282038 A1 | 11/2009 | Subotin et al. |
| 2009/0287750 A1 | 11/2009 | Banavar et al. |
| 2009/0307307 A1 | 12/2009 | Igarashi |
| 2009/0327489 A1 | 12/2009 | Swildens et al. |
| 2009/0327517 A1 | 12/2009 | Sivasubramanian et al. |
| 2009/0327914 A1 | 12/2009 | Adar et al. |
| 2010/0005175 A1 | 1/2010 | Swildens et al. |
| 2010/0011061 A1 | 1/2010 | Hudson et al. |
| 2010/0011126 A1 | 1/2010 | Hsu et al. |
| 2010/0020699 A1 | 1/2010 | On |
| 2010/0023601 A1 | 1/2010 | Lewin et al. |
| 2010/0030662 A1 | 2/2010 | Klein |
| 2010/0030914 A1 | 2/2010 | Sparks et al. |
| 2010/0034470 A1 | 2/2010 | Valencia-Campo et al. |
| 2010/0036944 A1 | 2/2010 | Douglis et al. |
| 2010/0042725 A1 | 2/2010 | Jeon et al. |
| 2010/0057894 A1 | 3/2010 | Glasser |
| 2010/0070603 A1 | 3/2010 | Moss et al. |
| 2010/0082787 A1 | 4/2010 | Kommula et al. |
| 2010/0088367 A1 | 4/2010 | Brown et al. |
| 2010/0088405 A1 | 4/2010 | Huang et al. |
| 2010/0100629 A1 | 4/2010 | Raciborski et al. |
| 2010/0111059 A1 | 5/2010 | Bappu et al. |
| 2010/0115133 A1 | 5/2010 | Joshi |
| 2010/0115342 A1 | 5/2010 | Shigeta et al. |
| 2010/0121953 A1 | 5/2010 | Friedman et al. |
| 2010/0121981 A1 | 5/2010 | Drako |
| 2010/0122069 A1 | 5/2010 | Gonion |
| 2010/0125626 A1 | 5/2010 | Lucas et al. |
| 2010/0125673 A1 | 5/2010 | Richardson et al. |
| 2010/0125675 A1 | 5/2010 | Richardson et al. |
| 2010/0128638 A1 | 5/2010 | Navas et al. |
| 2010/0131646 A1 | 5/2010 | Drako |
| 2010/0138559 A1 | 6/2010 | Sullivan et al. |
| 2010/0150155 A1 | 6/2010 | Napierala |
| 2010/0161799 A1 | 6/2010 | Maloo |
| 2010/0169392 A1 | 7/2010 | Lev Ran et al. |
| 2010/0169452 A1 | 7/2010 | Atluri et al. |
| 2010/0192225 A1 | 7/2010 | Ma et al. |
| 2010/0217801 A1 | 8/2010 | Leighton et al. |
| 2010/0217856 A1 | 8/2010 | Falkena |
| 2010/0223364 A1 | 9/2010 | Wei |
| 2010/0226372 A1 | 9/2010 | Watanabe |
| 2010/0228819 A1 | 9/2010 | Wei |
| 2010/0257024 A1 | 10/2010 | Holmes et al. |

(56) References Cited

U.S. PATENT DOCUMENTS

| | | |
|---|---|---|
| 2010/0257266 A1 | 10/2010 | Holmes et al. |
| 2010/0257566 A1 | 10/2010 | Matila |
| 2010/0268789 A1 | 10/2010 | Yoo et al. |
| 2010/0268814 A1 | 10/2010 | Cross et al. |
| 2010/0274765 A1 | 10/2010 | Murphy et al. |
| 2010/0281482 A1 | 11/2010 | Pike et al. |
| 2010/0293296 A1 | 11/2010 | Hsu et al. |
| 2010/0293479 A1 | 11/2010 | Rousso et al. |
| 2010/0299427 A1 | 11/2010 | Joshi |
| 2010/0299438 A1 | 11/2010 | Zimmerman et al. |
| 2010/0299439 A1 | 11/2010 | McCarthy et al. |
| 2010/0312861 A1 | 12/2010 | Kolhi et al. |
| 2010/0318508 A1 | 12/2010 | Brawer et al. |
| 2010/0322255 A1 | 12/2010 | Hao et al. |
| 2010/0325365 A1 | 12/2010 | Colglazier et al. |
| 2010/0332595 A1 | 12/2010 | Fullagar et al. |
| 2011/0010244 A1 | 1/2011 | Hatridge |
| 2011/0029598 A1 | 2/2011 | Arnold et al. |
| 2011/0040893 A1 | 2/2011 | Karaoguz et al. |
| 2011/0055714 A1 | 3/2011 | Vemulapalli et al. |
| 2011/0055921 A1 | 3/2011 | Narayanaswamy et al. |
| 2011/0058675 A1 | 3/2011 | Brueck et al. |
| 2011/0072138 A1 | 3/2011 | Canturk et al. |
| 2011/0072366 A1 | 3/2011 | Spencer |
| 2011/0078000 A1 | 3/2011 | Ma et al. |
| 2011/0078230 A1 | 3/2011 | Sepulveda |
| 2011/0085654 A1 | 4/2011 | Jana et al. |
| 2011/0087769 A1 | 4/2011 | Holmes et al. |
| 2011/0096987 A1 | 4/2011 | Morales et al. |
| 2011/0113467 A1 | 5/2011 | Agarwal et al. |
| 2011/0153938 A1 | 6/2011 | Verzunov et al. |
| 2011/0153941 A1 | 6/2011 | Spatscheck et al. |
| 2011/0154318 A1 | 6/2011 | Oshins et al. |
| 2011/0161461 A1 | 6/2011 | Niven-Jenkins |
| 2011/0166935 A1 | 7/2011 | Armentrout et al. |
| 2011/0191445 A1 | 8/2011 | Dazzi |
| 2011/0191449 A1 | 8/2011 | Swildens et al. |
| 2011/0191459 A1 | 8/2011 | Joshi |
| 2011/0208876 A1 | 8/2011 | Richardson et al. |
| 2011/0208958 A1 | 8/2011 | Stuedi et al. |
| 2011/0209064 A1 | 8/2011 | Jorgensen et al. |
| 2011/0219120 A1 | 9/2011 | Farber et al. |
| 2011/0219372 A1 | 9/2011 | Agarwal et al. |
| 2011/0238501 A1 | 9/2011 | Almeida |
| 2011/0238793 A1 | 9/2011 | Bedare et al. |
| 2011/0239215 A1 | 9/2011 | Sugai |
| 2011/0252142 A1 | 10/2011 | Richardson et al. |
| 2011/0252143 A1 | 10/2011 | Baumback et al. |
| 2011/0258049 A1 | 10/2011 | Ramer et al. |
| 2011/0258614 A1 | 10/2011 | Tamm |
| 2011/0270964 A1 | 11/2011 | Huang et al. |
| 2011/0276623 A1 | 11/2011 | Girbal |
| 2011/0296053 A1 | 12/2011 | Medved et al. |
| 2011/0302304 A1 | 12/2011 | Baumback et al. |
| 2011/0320559 A1 | 12/2011 | Foti |
| 2012/0011190 A1 | 1/2012 | Driesen et al. |
| 2012/0023090 A1 | 1/2012 | Holloway et al. |
| 2012/0036238 A1 | 2/2012 | Sundaram et al. |
| 2012/0066360 A1 | 3/2012 | Ghosh |
| 2012/0072600 A1 | 3/2012 | Richardson et al. |
| 2012/0078998 A1 | 3/2012 | Son et al. |
| 2012/0089972 A1 | 4/2012 | Scheidel et al. |
| 2012/0096065 A1 | 4/2012 | Suit et al. |
| 2012/0124184 A1 | 5/2012 | Sakata et al. |
| 2012/0131177 A1 | 5/2012 | Brandt et al. |
| 2012/0136697 A1 | 5/2012 | Peles et al. |
| 2012/0159476 A1 | 6/2012 | Ramteke et al. |
| 2012/0166516 A1 | 6/2012 | Simmons et al. |
| 2012/0169646 A1 | 7/2012 | Berkes et al. |
| 2012/0173677 A1 | 7/2012 | Richardson et al. |
| 2012/0173760 A1 | 7/2012 | Jog et al. |
| 2012/0179817 A1 | 7/2012 | Bade et al. |
| 2012/0179839 A1 | 7/2012 | Raciborski et al. |
| 2012/0198043 A1 | 8/2012 | Hesketh et al. |
| 2012/0198071 A1 | 8/2012 | Black et al. |
| 2012/0224516 A1 | 9/2012 | Stojanovski et al. |
| 2012/0226649 A1 | 9/2012 | Kovacs et al. |
| 2012/0233522 A1 | 9/2012 | Barton et al. |
| 2012/0233668 A1 | 9/2012 | Leafe et al. |
| 2012/0278831 A1 | 11/2012 | van Coppenolle et al. |
| 2012/0303785 A1 | 11/2012 | Sivasubramanian et al. |
| 2012/0303804 A1 | 11/2012 | Sundaram et al. |
| 2012/0311648 A1 | 12/2012 | Swildens et al. |
| 2012/0324089 A1 | 12/2012 | Joshi |
| 2013/0003735 A1 | 1/2013 | Chao et al. |
| 2013/0007100 A1 | 1/2013 | Trahan et al. |
| 2013/0007101 A1 | 1/2013 | Trahan et al. |
| 2013/0007102 A1 | 1/2013 | Trahan et al. |
| 2013/0007241 A1 | 1/2013 | Trahan et al. |
| 2013/0007273 A1 | 1/2013 | Baumback et al. |
| 2013/0019311 A1 | 1/2013 | Swildens et al. |
| 2013/0041872 A1 | 2/2013 | Aizman et al. |
| 2013/0046869 A1 | 2/2013 | Jenkins et al. |
| 2013/0054675 A1 | 2/2013 | Jenkins et al. |
| 2013/0055374 A1 | 2/2013 | Kustarz et al. |
| 2013/0080420 A1 | 3/2013 | Taylor et al. |
| 2013/0080421 A1 | 3/2013 | Taylor et al. |
| 2013/0080576 A1 | 3/2013 | Taylor et al. |
| 2013/0080577 A1 | 3/2013 | Taylor et al. |
| 2013/0086001 A1 | 4/2013 | Bhogal et al. |
| 2013/0117282 A1 | 5/2013 | Mugali, Jr. et al. |
| 2013/0117849 A1 | 5/2013 | Golshan et al. |
| 2013/0130221 A1 | 5/2013 | Kortemeyer et al. |
| 2013/0151646 A1 | 6/2013 | Chidambaram et al. |
| 2013/0198341 A1 | 8/2013 | Kim |
| 2013/0212300 A1 | 8/2013 | Eggleston et al. |
| 2013/0227165 A1 | 8/2013 | Liu |
| 2013/0246567 A1 | 9/2013 | Green et al. |
| 2013/0254269 A1 | 9/2013 | Sivasubramanian et al. |
| 2013/0268616 A1 | 10/2013 | Sakata et al. |
| 2013/0279335 A1 | 10/2013 | Ahmadi |
| 2013/0305046 A1 | 11/2013 | Mankovski et al. |
| 2013/0311583 A1* | 11/2013 | Humphreys ............ H04L 51/14 709/206 |
| 2013/0311605 A1 | 11/2013 | Richardson et al. |
| 2013/0318153 A1 | 11/2013 | Sivasubramanian et al. |
| 2013/0339429 A1 | 12/2013 | Richardson et al. |
| 2013/0346567 A1 | 12/2013 | Richardson et al. |
| 2014/0007239 A1 | 1/2014 | Sharpe et al. |
| 2014/0019605 A1 | 1/2014 | Boberg |
| 2014/0036675 A1 | 2/2014 | Wang et al. |
| 2014/0040478 A1 | 2/2014 | Hsu et al. |
| 2014/0053022 A1 | 2/2014 | Forgette et al. |
| 2014/0059120 A1 | 2/2014 | Richardson et al. |
| 2014/0059198 A1 | 2/2014 | Richardson et al. |
| 2014/0059379 A1 | 2/2014 | Ren et al. |
| 2014/0075109 A1 | 3/2014 | Richardson et al. |
| 2014/0089917 A1 | 3/2014 | Attalla et al. |
| 2014/0108672 A1 | 4/2014 | Ou et al. |
| 2014/0143320 A1 | 5/2014 | Sivasubramanian et al. |
| 2014/0165061 A1 | 6/2014 | Greene et al. |
| 2014/0215019 A1 | 7/2014 | Ahrens |
| 2014/0257891 A1 | 9/2014 | Richardson et al. |
| 2014/0280679 A1 | 9/2014 | Dey et al. |
| 2014/0297870 A1 | 10/2014 | Eggleston et al. |
| 2014/0310402 A1 | 10/2014 | Giaretta et al. |
| 2014/0310811 A1 | 10/2014 | Hentunen |
| 2014/0325155 A1 | 10/2014 | Marshall et al. |
| 2014/0331328 A1 | 11/2014 | Wang et al. |
| 2014/0337472 A1 | 11/2014 | Newton et al. |
| 2014/0365666 A1 | 12/2014 | Richardson et al. |
| 2015/0006615 A1 | 1/2015 | Wainner et al. |
| 2015/0081842 A1 | 3/2015 | Richardson et al. |
| 2015/0172379 A1 | 6/2015 | Richardson et al. |
| 2015/0172407 A1 | 6/2015 | MacCarthaigh et al. |
| 2015/0172414 A1 | 6/2015 | Richardson et al. |
| 2015/0172415 A1 | 6/2015 | Richardson et al. |
| 2015/0180988 A1 | 6/2015 | Sivasubramanian et al. |
| 2015/0188734 A1 | 7/2015 | Petrov |
| 2015/0188994 A1 | 7/2015 | Marshall et al. |
| 2015/0189042 A1 | 7/2015 | Sun et al. |
| 2015/0195244 A1 | 7/2015 | Richardson et al. |
| 2015/0207733 A1 | 7/2015 | Richardson et al. |
| 2015/0215270 A1 | 7/2015 | Sivasubramanian et al. |

(56) References Cited

U.S. PATENT DOCUMENTS

| | | |
|---|---|---|
| 2015/0215656 A1 | 7/2015 | Pulung et al. |
| 2015/0229710 A1 | 8/2015 | Sivasubramanian et al. |
| 2015/0249579 A1 | 9/2015 | Ellsworth et al. |
| 2015/0256647 A1 | 9/2015 | Richardson et al. |
| 2015/0263927 A1 | 9/2015 | Baumback et al. |
| 2015/0288647 A1 | 10/2015 | Chhabra et al. |
| 2015/0319194 A1 | 11/2015 | Richardson et al. |
| 2015/0319260 A1 | 11/2015 | Watson |
| 2015/0334082 A1 | 11/2015 | Richardson et al. |
| 2016/0026568 A1 | 1/2016 | Marshall et al. |
| 2016/0028644 A1 | 1/2016 | Richardson et al. |
| 2016/0028755 A1 | 1/2016 | Vasseur et al. |
| 2016/0036857 A1* | 2/2016 | Foxhoven ............... H04L 63/20 726/1 |
| 2016/0041910 A1 | 2/2016 | Richardson et al. |
| 2016/0057072 A1 | 2/2016 | Baumback et al. |
| 2016/0065665 A1 | 3/2016 | Richardson et al. |
| 2016/0072720 A1 | 3/2016 | Richardson et al. |
| 2016/0182542 A1 | 6/2016 | Staniford |
| 2016/0205062 A1 | 7/2016 | Mosert |
| 2016/0241637 A1 | 8/2016 | Marr et al. |
| 2016/0241639 A1 | 8/2016 | Brookins et al. |
| 2016/0241651 A1 | 8/2016 | Sivasubramanian et al. |
| 2016/0308959 A1 | 10/2016 | Richardson et al. |
| 2017/0041428 A1 | 2/2017 | Katsev |
| 2017/0085495 A1 | 3/2017 | Richardson et al. |
| 2017/0126557 A1 | 5/2017 | Richardson et al. |
| 2017/0126796 A1 | 5/2017 | Hollis et al. |
| 2017/0142062 A1 | 5/2017 | Richardson et al. |
| 2017/0180217 A1 | 6/2017 | Puchala et al. |
| 2017/0180267 A1 | 6/2017 | Puchala et al. |
| 2017/0214755 A1 | 7/2017 | Sivasubramanian et al. |

FOREIGN PATENT DOCUMENTS

| | | | |
|---|---|---|---|
| CN | 1511399 | A | 7/2004 |
| CN | 1605182 | A | 4/2005 |
| CN | 101189598 | A | 5/2008 |
| CN | 101460907 | A | 6/2009 |
| CN | 101473598 | A | 7/2009 |
| CN | 103731481 | A | 4/2014 |
| EP | 1603307 | A2 | 12/2005 |
| EP | 1351141 | A2 | 10/2007 |
| EP | 2008167 | A2 | 12/2008 |
| EP | 3156911 | A1 | 4/2017 |
| JP | 2001-0506093 | | 5/2001 |
| JP | 2001-249907 | | 9/2001 |
| JP | 2002-044137 | | 2/2002 |
| JP | 2003-167810 | A | 6/2003 |
| JP | 2003-167813 | A | 6/2003 |
| JP | 2003-522358 | A | 7/2003 |
| JP | 2003188901 | A | 7/2003 |
| JP | 2004-533738 | A | 11/2004 |
| JP | 2005-537687 | | 12/2005 |
| JP | 2007-133896 | A | 5/2007 |
| JP | 2008-515106 | | 5/2008 |
| JP | 2009-071538 | A | 4/2009 |
| JP | 2012-509623 | | 4/2012 |
| WO | WO 2002/069608 | A2 | 9/2002 |
| WO | WO 2005/071560 | A1 | 8/2005 |
| WO | WO 2007/007960 | A1 | 1/2007 |
| WO | WO 2007/126837 | A2 | 11/2007 |
| WO | WO 2009124006 | A2 | 10/2009 |
| WO | WO 2010/002603 | A1 | 1/2010 |
| WO | WO 2012/044587 | | 4/2012 |
| WO | WO 2017/106455 | A1 | 6/2017 |

OTHER PUBLICATIONS

Partial Supplementary Search Report in European Application No. 09826977.2 dated Oct. 4, 2016.
Office Action in Chinese Application No. 201310717573.1 dated Jul. 29, 2016.
Decision of Rejection in Chinese Application No. 201180046104.0 dated Oct. 17, 2016.
Office Action in Canadian Application No. 2816612 dated Oct. 7, 2016.
Office Action in European Application No. 09839809.2 dated Dec. 8, 2016.
Office Action in Canadian Application No. 2816612 dated Aug. 8, 2017.
Supplementary Examination Report in Singapore Application No. 11201501987U dated May 17, 2017.
Office Action in Chinese Application No. 201310537815.9 dated Jun. 2, 2017.
International Search Report and Written Opinion in PCT/US/2016/066848 dated May 1, 2017.
Notice of Allowance for U.S. Appl. No. 14/091,272, dated Sep. 26, 2018, 12 pages.
Non-Final Office Action dated Jan. 3, 2012, U.S. Appl. No. 12/652,541; dated Jan. 3, 2012; 35 pages.
Final Office Action dated Sep. 5, 2012, U.S. Appl. No. 12/652,541; dated Sep. 5, 2012; 40 pages.
Notice of Allowance dated Jan. 4, 2013, U.S. Appl. No. 12/652,541; dated Jan. 4, 2013; 11 pages.
Non-Final Office Action dated Apr. 30, 2014, U.S. Appl. No. 13/842,970; 20 pages.
Final Office Action dated Aug. 19, 2014, U.S. Appl. No. 13/842,970; 13 pages.
Notice of Allowance dated Dec. 5, 2014, U.S. Appl. No. 13/842,970; 6 pages.
Canonical Name (CNAME) DNS Records, domainavenue.com, Feb. 1, 2001, XP055153783, Retrieved from the Internet: URL:http://www.domainavenue.com/cname.htm [retrieved on Nov. 18, 2014].
"Content delivery network", Wikipedia, the free encyclopedia, Retrieved from the Internet: URL:http://en.wikipedia.org/w/index.php?title=Contentdeliverynetwork&oldid=601009970, XP055153445, Mar. 24, 2008.
"Global Server Load Balancing with ServerIron," Foundry Networks, retrieved Aug. 30, 2007, from http://www.foundrynet.com/pdf/an-global-server-load-bal.pdf, 7 pages.
"Grid Computing Solutions," Sun Microsystems, Inc., retrieved May 3, 2006, from http://www.sun.com/software/grid, 3 pages.
"Grid Offerings," Java.net, retrieved May 3, 2006, from http://wiki.java.net/bin/view/Sungrid/OtherGridOfferings, 8 pages.
"Recent Advances Boost System Virtualization," eWeek.com, retrieved from May 3, 2006, http://www.eWeek.com/article2/0,1895,1772626,00.asp, 5 pages.
"Scaleable Trust of Next Generation Management (STRONGMAN)," retrieved May 17, 2006, from http://www.cis.upenn.edu/~dsl/STRONGMAN/, 4 pages.
"Sun EDA Compute Ranch," Sun Microsystems, Inc., retrieved May 3, 2006, from http://sun.com/processors/ranch/brochure.pdf, 2 pages.
"Sun Microsystems Accelerates UltraSP ARC Processor Design Program With New Burlington, Mass. Compute Ranch," Nov. 6, 2002, Sun Microsystems, Inc., retrieved May 3, 2006, from http://www.sun.com/smi/Press/sunflash/2002-11/sunflash.20021106.3.xml, 2 pages.
"Sun N1 Grid Engine 6," Sun Microsystems, Inc., retrieved May 3, 2006, from http://www.sun.com/software/gridware/index.xml, 3 pages.
"Sun Opens New Processor Design Compute Ranch," Nov. 30, 2001, Sun Microsystems, Inc., retrieved May 3, 2006, from http://www.sun.com/smi/Press/sunflash/2001-11/sunflash.20011130.1.xml, 3 pages.
"The Softricity Desktop," Softricity, Inc., retrieved May 3, 2006, from http://www.softricity.com/products/, 3 pages.
"Xen—The Xen virtual Machine Monitor," University of Cambridge Computer Laboratory, retrieved Nov. 8, 2005, from http://www.cl.cam.ac.uk/Research/SRG/netos/xen/, 2 pages.
"XenFaq," retrieved Nov. 8, 2005, from http://wiki.xensource.com/xenwiki/XenFaq?action=print, 9 pages.
Abi, Issam, et al., "A Business Driven Management Framework for Utility Computing Environments," Oct. 12, 2004, HP Laboratories Bristol, HPL-2004-171, retrieved Aug. 30, 2007, from http://www.hpl.hp.com/techreports/2004/HPL-2004-171.pdf, 14 pages.

(56) References Cited

OTHER PUBLICATIONS

American Bar Association; Digital Signature Guidelines Tutorial [online]; Feb. 10, 2002 [retrieved on Mar. 2, 2010]; American Bar Association Section of Science and Technology Information Security Committee; Retrieved from the internet: (URL: http://web.archive.org/web/20020210124615/www.abanet.org/scitech/ec/isc/dsg-tutorial.html; pp. 1-8.
Armour et al., "A Heuristic Algorithm and Simulation Approach to Relative Location of Facilities"; Management Science, vol. 9, No. 2 (Jan. 1963); pp. 294-309.
Baglioni et al., "Preprocessing and Mining Web Log Data for Web Personalization", LNAI 2829, 2003, pp. 237-249.
Barbir, A., et al., "Known Content Network (CN) Request-Routing Mechanisms", Request for Comments 3568, [online], IETF, Jul. 2003, [retrieved on Feb. 26, 2013], Retrieved from the Internet: (URL: http://tools.ietf.org/rfc/rfc3568.txt).
Bellovin, S., "Distributed Firewalls," ;login;:37-39, Nov. 1999, http://www.cs.columbia.edu/-smb/papers/distfw. html, 10 pages, retrieved Nov. 11, 2005.
Blaze, M., "Using the KeyNote Trust Management System," Mar. 1, 2001, from http://www.crypto.com/trustmgt/kn.html, 4 pages, retrieved May 17, 2006.
Brenton, C., "What is Egress Filtering and How Can I Implement It?—Egress Filtering v 0.2," Feb. 29, 2000, SANS Institute, http://www.sans.org/infosecFAQ/firewall/egress.htm, 6 pages.
Byun et al., "A Dynamic Grid Services Deployment Mechanism for On-Demand Resource Provisioning", IEEE International Symposium on Cluster Computing and the Grid:863-870, 2005.
Chipara et al, "Realtime Power-Aware Routing in Sensor Network", IEEE, 2006, 10 pages.
Clark, C., "Live Migration of Virtual Machines," May 2005, NSDI '05: 2nd Symposium on Networked Systems Design and Implementation, Boston, MA, May 2-4, 2005, retrieved from http://www.usenix.org/events/nsdi05/tech/full_papers/clark/clark.pdf, 14 pages.
Coulson, D., "Network Security Iptables," Apr. 2003, Linuxpro, Part 2, retrieved from http://davidcoulson.net/writing/lxf/38/iptables.pdf, 4 pages.
Coulson, D., "Network Security Iptables," Mar. 2003, Linuxpro, Part 1, retrieved from http://davidcoulson.net/writing/lxf/39/iptables.pdf, 4 pages.
Deleuze, C., et al., A DNS Based Mapping Peering System for Peering CDNs, draft-deleuze-cdnp-dnsmap-peer-00.txt, Nov. 20, 2000, 20 pages.
Demers, A., "Epidemic Algorithms for Replicated Database Maintenance," 1987, Proceedings of the sixth annual ACM Symposium on Principles of Distributed Computing, Vancouver, British Columbia, Canada, Aug. 10-12, 1987, 12 pages.
Gruener, J., "A Vision of Togetherness," May 24, 2004, NetworkWorld, retrieved May 3, 2006, from, http://www.networkworld.com/supp/2004/ndc3/0524virt.html, 9 pages.
Gunther et al, "Measuring Round Trip Times to determine the Distance between WLAN Nodes",May 2005, In Proc. Of Networking 2005, all pages.
Gunther et al, "Measuring Round Trip Times to determine the Distance between WLAN Nodes", Dec. 18, 2004, Technical University Berlin, all pages.
Hartung et al.; Digital rights management and watermarking of multimedia content for m-commerce applications; Published in: Communications Magazine, IEEE (vol. 38, Issue: 11 ); Date of Publication: Nov. 2000; pp. 78-84; IEEE Xplore.
Horvath et al., "Enhancing Energy Efficiency in Multi-tier Web Server Clusters via Prioritization," in Parallel and Distributed Processing Symposium, 2007. IPDPS 2007. IEEE International , vol., No., pp. 1-6, Mar. 26-30, 2007.
Ioannidis, S., et al., "Implementing a Distributed Firewall," Nov. 2000, (ACM) Proceedings of the ACM Computer and Communications Security (CCS) 2000, Athens, Greece, pp. 190-199, retrieved from http://www.cis.upenn.edu/~dls/STRONGMAN/Papers/df.pdf, 10 pages.

Joseph, Joshy, et al., "Introduction to Grid Computing," Apr. 16, 2004, retrieved Aug. 30, 2007, from http://www.informit.com/articles/printerfriendly.aspx?p=169508, 19 pages.
Kalafut et al., Understanding Implications of DNS Zone Provisioning., Proceeding IMC '08 Proceedings of the 8th AMC SIGCOMM conference on Internet measurement., pp. 211-216., ACM New York, NY, USA., 2008.
Kato, Yoshinobu , Server load balancer—Difference in distribution technique and supported protocol—Focus on function to meet the needs, Nikkei Communications, Japan, Nikkei Business Publications, Inc., Mar. 20, 2000, vol. 314, pp. 114 to 123.
Kenshi, P., "Help File Library: Iptables Basics," Justlinux, retrieved Dec. 1, 2005, from http://www.justlinux.com/nhf/Security/Iptables Basics.html, 4 pages.
Liu et al., "Combined mining of Web server logs and web contents for classifying user navigation patterns and predicting users' future requests," Data & Knowledge Engineering 61 (2007) pp. 304-330.
Maesono, et al., "A Local Scheduling Method considering Data Transfer in Data Grid," Technical Report of IEICE, vol. 104, No. 692, pp. 435-440, The Institute of Electronics, Information and Communication Engineers, Japan, Feb. 2005.
Meng et al., "Improving the Scalability of Data Center Networks with Traffic-Aware Virtual Machine Placement"; Proceedings of the 29th Conference on Information Communications, INFOCOM'10, pp. 1154-1162. Piscataway, NJ. IEEE Press, 2010.
Mulligan et al.; How DRM-based content delivery systems disrupt expectations of "personal use"; Published in: Proceeding DRM '03 Proceedings of the 3rd ACM workshop on Digital rights management; 2003; pp. 77-89; ACM Digital Library.
Shankland, S., "Sun to buy start-up to bolster N1 ," Jul. 30, 2003, CNet News.com, retrieved May 3, 2006, http://news.zdnet.com/2100-3513_22-5057752.html, 8 pages.
Strand, L., "Adaptive distributed firewall using intrusion detection," Nov. 1, 2004, University of Oslo Department of Informatics, retrieved Mar. 8, 2006, from http://gnist.org/~lars/studies/master/StrandLars-master.pdf, 158 pages.
Takizawa, et al., "Scalable MultiReplication Framework on the Grid," Report of Study of Information Processing Society of Japan, Information Processing Society, vol. 2004, No. 81, pp. 247-252, Japan, Aug. 1, 2004.
Tan et al., "Classification: Basic Concepts, Decision Tree, and Model Evaluation", Introduction in Data Mining; http://www-users.cs.umn.edu/~kumar/dmbook/ch4.pdf, 2005, pp. 245-205.
Van Renesse, R., "Astrolabe: A Robust and Scalable Technology for Distributed System Monitoring, Management, and Data Mining," May 2003, ACM Transactions on Computer Systems (TOCS), 21 (2): 164-206, 43 pages.
Vijayan, J., "Terraspring Gives Sun's N1 a Boost," Nov. 25, 2002, Computerworld, retrieved May 3, 2006, from http://www.computerworld.com/printthis/2002/0,4814, 76159,00.html, 3 pages.
Virtual Iron Software Home, Virtual Iron, retrieved May 3, 2006, from http://www.virtualiron.com/, 1 page.
Waldspurger, CA., "Spawn: A Distributed Computational Economy," Feb. 1992, IEEE Transactions on Software Engineering, 18(2): 103-117, 15 pages.
Watanabe, et al., "Remote Program Shipping System for GridRPC Systems," Report of Study of Information Processing Society of Japan, Information Processing Society, vol. 2003, No. 102, pp. 73-78, Japan, Oct. 16, 2003.
Xu et al., "Decision tree regression for soft classification of remote sensing data", Remote Sensing of Environment 97 (2005) pp. 322-336.
Yamagata, et al., "A virtual-machine based fast deployment tool for Grid execution environment, " Report of Study of Information Processing Society of Japan, Information Processing Society, vol. 2006, No. 20, pp. 127-132, Japan, Feb. 28, 2006.
Zhu, Xiaoyun, et al., "Utility-Driven Workload Management Using Nested Control Design," Mar. 29, 2006, HP Laboratories Palo Alto, HPL-2005-193(R.1), retrieved Aug. 30, 2007, from http://www.hpl.hp.com/techreports/2005/HPL-2005-193R1.pdf, 9 pages.
Supplementary European Search Report in Application No. 09729072.0 2266064 dated Dec. 10, 2014.

(56) References Cited

OTHER PUBLICATIONS

First Singapore Written Opinion in Application No. 201006836-9, dated Oct. 12, 2011 in 12 pages.
Singapore Written Opinion in Application No. 201006836-9, dated Apr. 30, 2012 in 10 pages.
First Office Action in Chinese Application No. 200980111422.3 dated Apr. 13, 2012.
First Office Action in Japanese Application No. 2011-502138 dated Feb. 1, 2013.
Singapore Written Opinion in Application No. 201006837-7, dated Oct. 12, 2011 in 11 pages.
Supplementary European Search Report in Application No. 09727694.3 dated Jan. 30, 2012 in 6 pages.
Singapore Examination Report in Application No. 201006837-7 dated Mar. 16, 2012.
First Office Action in Chinese Application No. 200980111426.1 dated Feb. 16, 2013.
Second Office Action in Chinese Application No. 200980111426.1 dated Dec. 25, 2013.
Third Office Action in Chinese Application No. 200980111426.1 dated Jul. 7, 2014.
Fourth Office Action in Chinese Application No. 200980111426.1 dated Jan. 15, 2015.
Fifth Office Action in Chinese Application No. 200980111426.1 dated Aug. 14, 2015.
First Office Action in Japanese Application No. 2011-502139 dated Nov. 5, 2013.
Decision of Rejection in Application No. 2011-502139 dated Jun. 30, 2014.
Singapore Written Opinion in Application No. 201006874-0, dated Oct. 12, 2011 in 10 pages.
First Office Action in Japanese Application No. 2011-502140 dated Dec. 7, 2012.
First Office Action in Chinese Application No. 200980119995.0 dated Jul. 6, 2012.
Second Office Action in Chinese Application No. 200980119995.0 dated Apr. 15, 2013.
Examination Report in Singapore Application No. 201006874-0 dated May 16, 2012.
Search Report for European Application No. 09839809.2 dated May 11, 2015.
Supplementary European Search Report in Application No. 09728756.9 dated Jan. 8, 2013.
First Office Action in Chinese Application No. 200980119993.1 dated Jul. 4, 2012.
Second Office Action in Chinese Application No. 200980119993.1 dated Mar. 12, 2013.
Third Office Action in Chinese Application No. 200980119993.1 dated Oct. 21, 2013.
First Office Action in Japanese Application No. 2011-503091 dated Nov. 18, 2013.
Search Report and Written Opinion issued in Singapore Application No. 201006873-2 dated Oct. 12, 2011.
First Office Action is Chinese Application No. 200980125551.8 dated Jul. 4, 2012.
First Office Action in Japanese Application No. 2011-516466 dated Mar. 6, 2013.
Second Office Action in Japanese Application No. 2011-516466 dated Mar. 17, 2014.
Decision of Refusal in Japanese Application No. 2011-516466 dated Jan. 16, 2015.
Office Action in Canadian Application No. 2726915 dated May 13, 2013.
First Office Action in Korean Application No. 10-2011-7002461 dated May 29, 2013.
First Office Action in Chinese Application No. 200980145872.4 dated Nov. 29, 2012.
First Office Action in Canadian Application No. 2741895 dated Feb. 25, 2013.
Second Office Action in Canadian Application No. 2741895 dated Oct. 21, 2013.
Search Report and Written Opinion in Singapore Application No. 201103333-9 dated Nov. 19, 2012.
Examination Report in Singapore Application No. 201103333-9 dated Aug. 13, 2013.
International Search Report and Written Opinion in PCT/US2011/053302 dated Nov. 28, 2011 in 11 pages.
International Preliminary Report on Patentability in PCT/US2011/053302 dated Apr. 2, 2013.
First Office Action in Japanese Application No. 2013-529454 dated Feb. 3, 2014 in 6 pages.
Office Action in Japanese Application No. 2013-529454 dated Mar. 9, 2015 in 8 pages.
First Office Action issued in Australian Application No. 2011307319 dated Mar. 6, 2014 in 5 pages.
Search Report and Written Opinion in Singapore Application No. 201301573-0 dated Jul. 1, 2014.
First Office Action in Chinese Application No. 201180046104.0 dated Nov. 3, 2014.
Second Office Action in Chinese Application No. 201180046104.0 dated Sep. 29, 2015.
Examination Report in Singapore Application No. 201301573-0 dated Dec. 22, 2014.
International Preliminary Report on Patentability in PCT/US2011/061486 dated May 22, 2013.
International Search Report and Written Opinion in PCT/US2011/061486 dated Mar. 30, 2012 in 11 pages.
First Office Action in Chinese Application No. 201180053405.6 dated May 3, 2015.
Office Action in Japanese Application No. 2013-540982 dated Jun. 2, 2014.
Written Opinion in Singapore Application No. 201303521-7 dated May 20, 2014.
International Search Report and Written Opinion in PCT/US07/07601 dated Jul. 18, 2008 in 11 pages.
International Preliminary Report on Patentability in PCT/US2007/007601 dated Sep. 30, 2008 in 8 pages.
Supplementary European Search Report in Application No. 07754164.7 dated Dec. 20, 2010 in 7 pages.
Office Action in Chinese Application No. 200780020255.2 dated Mar. 4, 2013.
Office Action in Indian Application No. 3742/KOLNP/2008 dated Nov. 22, 2013.
Office Action in Japanese Application No. 2012-052264 dated Dec. 11, 2012 in 26 pages.
Office Action in Japanese Application No. 2013-123086 dated Apr. 15, 2014 in 3 pages.
Office Action in Japanese Application No. 2013-123086 dated Dec. 2, 2014 in 2 pages.
Al-Fares, M. et al., A Scalable, Commodity Data Center Network Architecture, SIGCOMM '08 Proceedings, Aug. 17, 2008, pp. 63-74, 66-68, 70-71, Seattle, WA.
Bennami, M., et al., Resource Allocation for Autonomic Data Centers Using Analytic Performance Models, 2005, IEEE, 12 pages.
Chang, F., et al., Automatic Configuration and Run-time Adaptation of Distributed Applications, 2000, IEEE, 10 pages.
Greenberg, A. et al., Networking the Cloud, 29th IEEE International Conference on Distributed Computing Systems (ICDCS 2009), Jun. 22, 2009-Jun. 26, 2009 [online] retrieved from the Internet on Mar. 10, 2011: http://www.cse.ohio-state.edu/icdcs2009/Keynote_files/greenberg-keynote.pdf, pp. 1-45.
Greenberg, A. et al., Towards a Next Generation Data Center Architecture: Scalability and Commoditization, SIGCOMM '08: Proceedings of the 2008 SIGCOMM Conference and Co-Located Workshops NSDR '08, WOSN '08, MOBIARCH '08, NETECON '08, & Presto '08, Seattle, WA, Aug. 17-28, 2008, ACM, Aug. 17, 2008, pp. 57-62, New York, NY.
Greenberg, A. et al., VL2: A scalable and flexible data center network, SIGCOMM '09, Proceedings of the ACM SIGCOMM 2009 Conference on Data Communication, Aug. 17, 2009, vol. 39, Issue 4, pp. 51-62.

(56) References Cited

OTHER PUBLICATIONS

Guo, Understanding Memory Resource Management in Vmware vSphere 5.0, Vmware, 2011, 29 pages.

Kounev, S., et al., Autonomic QoS-Aware Resource Management in Grid Computing Using Online Performance Models, 2007, ICST, Valuetools, 2007, 10 pages.

Mysore, R.N. et al., Portland: a scalable fault-tolerant layer 2 data center network fabric, SIGCOMM '09, Proceedings of the ACM SIGCOMM 2009 Conference on Data Communication, Aug. 17, 2009, pp. 39-50.

Nilsson et al., IP-Address Lookup Using LC-Tries, IEEE Journal on Selected Areas of Communication, Jun. 1999, vol. 17, Issue 6, pp. 1083-1092.

Sharif et al, "Secure In-VM Monitoring Using Hardware Virtualization", Microsoft, Oct. 2009 http://research.microsoft.com/pubs/153179/sim-ccs09.pdf; 11 pages.

Office Action in Japanese Application No. 2014-225580 dated Oct. 26, 2015.

International Search Report and Written Opinion in PCT/US2010/060567 dated Mar. 28, 2012.

International Preliminary Report on Patentability and Written Opinion in PCT/US2010/060567 dated Jun. 19, 2012.

Office Action in Canadian Application No. 2784699 dated Apr. 28, 2014.

Office Action in Chinese Application No. 201080057225.0 dated Jul. 2, 2014.

Office Action in Chinese Application No. 201080057225.0 dated May 14, 2015.

International Preliminary Report on Patentability and Written Opinion in PCT/US2010/060573 dated Jun. 19, 2012.

Office Action in Chinese Application No. 201080057155.9 dated Jul. 24, 2014.

Office Action in Chinese Application No. 201080057155.9 dated May 21, 2015.

International Preliminary Report on Patentability and Written Opinion in PCT/US2010/060569 dated Jun. 19, 2012.

Office Action in Canadian Application No. 2784706 dated May 22, 2014.

First Office Action in Chinese Application No. 201080057229.9 dated May 14, 2014.

Second Office Action in Chinese Application No. 201080057229.9 dated Mar. 18, 2015.

Office Action in Canadian Application No. 2816612 dated Nov. 3, 2015.

Second Office Action in Chinese Application No. 201180053405.6 dated Dec. 4, 2015.

Office Action in European Application No. 07754164.7 dated Dec. 14, 2015.

\* cited by examiner

SELECTIVE ROUTING OF DOMAIN NAME SYSTEM (DNS) REQUESTS

BACKGROUND

Cloud computing is the use of computing resources (hardware and software) which are available in a remote location and accessible over a network, such as the Internet. Users are able to buy these computing resources (including storage and computing power) as a utility on demand. Cloud computing entrusts remote services with a user's data, software and computation. Use of virtual computing resources can provide a number of advantages including cost advantages and/or ability to adapt rapidly to changing computing resource needs.

The Domain Name System (DNS) is a naming system for services, computers or other resources connected to the Internet. DNS translates easy-to-remember domain names to the numerical IP addresses needed for connection to computer services and devices worldwide. The DNS system also acts like a network. For example, if one DNS server cannot translate a particular domain name, it can send a request to another DNS server, and so on, until the correct IP address is found and returned.

DNS names are publicly available from a domain name registrar. A person or entity registers their domain name and an associated IP address and any member of the public that uses the domain name in a browser is directed to a website at the IP address. Sometimes restrictions are placed on entering the website, but, nonetheless, a DNS resolver does provide the IP address to the requester. Consequently, domain names and their associated addresses are considered publicly available information.

DETAILED DESCRIPTION

Domain Name System (DNS) requests can be routed to either a private DNS server or a public DNS server based on a determination made by a DNS classifier. The private DNS server allows customers to use custom private domain names for internal resources without exposing the names or IP addresses to the public Internet. For example, a customer can use a name like db1.example.com to point to their own cloud-based database resource. Such a name is a private domain name under control by the customer and not available publicly, such as through a public domain name registrar. Customers can update their internal DNS configuration in a similar way to public DNS records update, via an API call or an update via a console.

Figure 1:
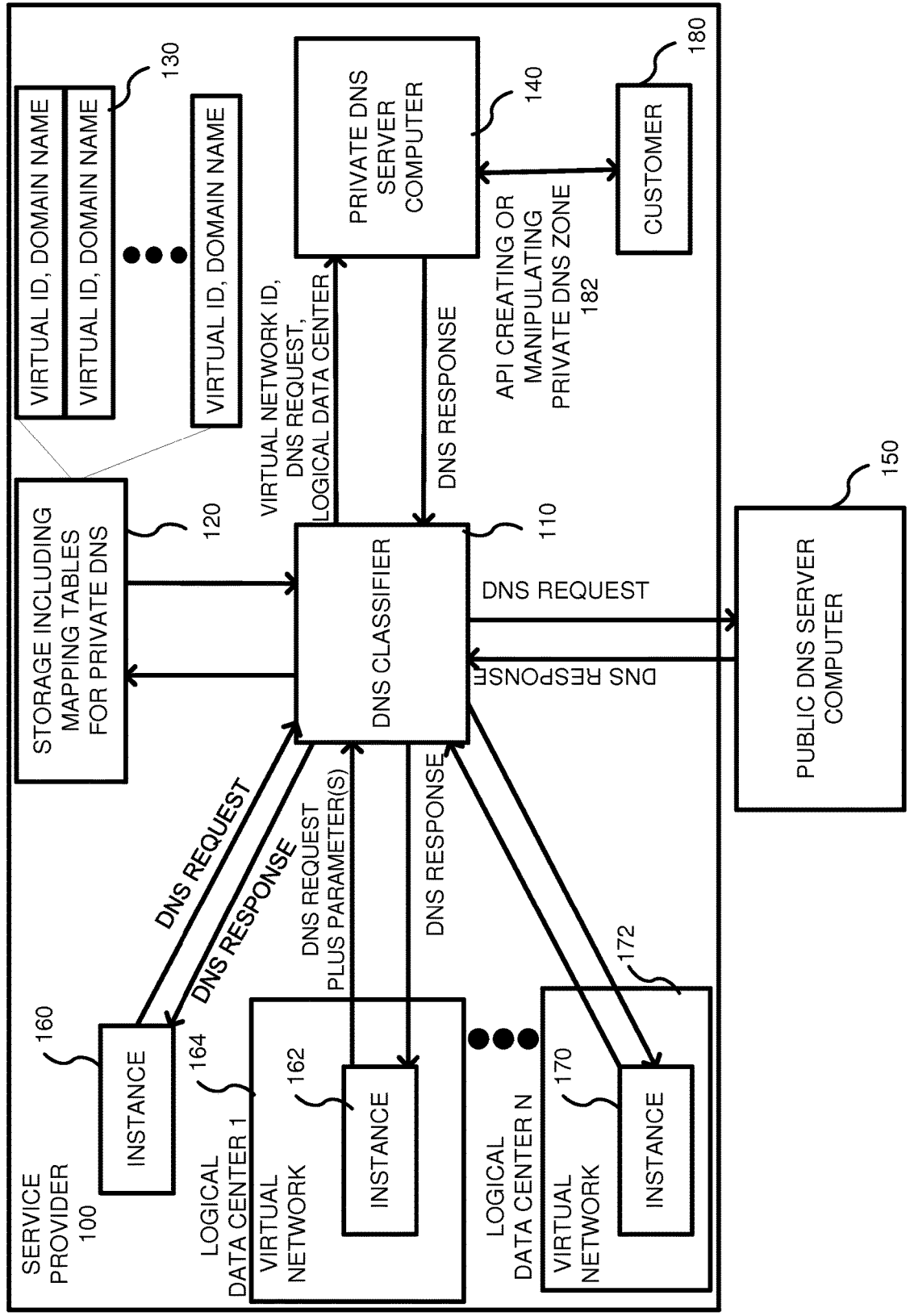
FIG. 1 is a service provider environment wherein a DNS classifier is used to route DNS requests to either a private DNS server computer or a public DNS server computer.

FIG. 1 shows an exemplary service provider environment 100 that selectively routes domain name system (DNS) requests. In particular, the service provider 100 includes a DNS classifier 110 that selectively routes DNS requests to different DNS server computers based at least on identifiers and domain names associated with the request. In one example, the DNS classifier 110 can route DNS requests based upon characteristics of the requester. Example characteristics can include whether or not the requests originated from a virtual network, from which logical data center the DNS requests originated, from which geographic region the DNS requests originated, etc. Based on these various input parameters, the DNS classifier 110 performs a lookup in storage 120, which includes mapping tables shown generally at 130. In the particular illustrated example, the DNS classifier 110 can use a virtual ID associated with the DNS request and a domain name associated with the request to perform a lookup within the mapping tables. If there is a match with the virtual ID and domain name, the DNS classifier can route the DNS request to a private DNS server computer 140 and the request can be resolved in a manner described further below. Otherwise, the DNS classifier 110 can route the DNS request to a public DNS server computer 150 so that the request can be handled in a well-known manner by the public DNS server computer outside of the service provider 100. In an example embodiment, the virtual ID can be an identifier for a customer's virtual network that includes one or more customer virtual machines (i.e., a virtual machine that sent a DNS request). The virtual ID can be assigned by the service provider when the virtual network is created and made available to the DNS classifier. Data packets generated by the virtual machines in the virtual network can be encapsulated by the computer system hosting the virtual machine with data usable to route the data packets within the service provider network. For example, the encapsulation can include various information such as an IP address/port number of the computer system that hosts the virtual machine and in an embodiment the virtual ID or a guest network identifier (i.e., an identifier internal to the service provider used to represent the virtual ID). When the DNS classifier receives the DNS request, the classifier can extract the virtual ID or guest network identifier from the encapsulation data and use it to perform the lookup within the mapping tables.

The intermediate DNS classifier 110 provides the ability to route requests differently based on one or more characteristics of the requests. An instance 160 that is outside a virtual network can have its DNS requests routed differently by the DNS classifier 110 than a similar instance 162 located within a virtual network 164, which is running in a server computer in a logical data center 1. Likewise an instance 170 within a virtual network 172 and operating in a logical data center N can have its DNS request routed differently by the classifier than the instance 162. Such selective routing by the DNS classifier can be controlled by a customer 180 of the service provider 100. In particular, the customer 180 can submit an API request 182 for creating or manipulating (e.g., changing, deleting, etc.) private DNS hosted zones within the service provider 100. In some embodiments, the instance can pass additional parameters with the DNS request to the DNS classifier 110, as is indicated by the DNS request from instance 162. The parameters can be customer-based parameters or service provider collected parameters. Example customer-based parameters can include an instance ID, a virtual network ID, a customer account ID, etc. Service provider collected parameters can include physical location of the instance, a server rack ID in which the instance is running, etc.

A private hosted zone is a container that holds information about how a customer wants to route traffic for a domain and its subdomains within one or more virtual private networks. In particular, a hosted zone can include a collection of resource record sets hosted within the service provider that are managed together under a single domain name. Each hosted zone can have its own metadata and configuration information. The resource record sets contained in a hosted zone can share the same suffix. For example, the example-.com hosted zone can contain resource record sets for www.example.com and www.abc.example.com subdomains. A console or API can be used by customers to create, list, modify, and delete hosted zones and their resource record sets. As a result, customers can create a private hosted zone and specify an identifier associated with the virtual private network so as to associate the private hosted zone and the virtual private network. Customers can further create resource record sets that determine how DNS queries are responded to for a customer's domain and subdomains within the virtual private network. Private and public hosted zones can be maintained for a same domain name. For example, a customer's domain can route some requests to an internal version of the website running in a service provider and an external version of the website (publicly available). Consequently, different internal and external IP addresses can be used for the same domain name. The private hosted zone can take precedence over the public hosted zone.

By setting up private hosted zones and associating the private hosted zones with virtual networks and domain names, the DNS classifier 110 in conjunction with the private DNS server computer 140 can provide customized domain name resolution responses to the requesting instance. As described further below, each virtual network 164 through 172 has its own unique virtual network ID that can be used by the DNS classifier 110 to perform the selective routing to either the private DNS server computer 140 or the public DNS server computer 150. Other parameters can be used in DNS classification, such as geographic region and the logical data center of origin for the requests. The customer 180 can use the private hosted zones to provide desired IP addresses to the requester based on the various input parameters.

Typically the DNS classifier communicates the DNS request to the private DNS server computer 140 using different information in the request than would be used to submit a request to the public DNS server computer 150. Thus, different parameters can be passed as part of the DNS request or different protocols used depending on which DNS server is used. For example, the public DNS server computer 150 may receive little information associated with the original requesting instance, but generally includes a domain name. By contrast, when the DNS classifier 110 communicates with the private DNS server 140, it communicates additional information about the requesting instance, such as an ID associated with the virtual network within which the instance is running, the domain name, the logical data center, the geographic region, etc. This additional information provides the customer 180 with the ability to customize the domain name resolution response using one or more of these various input parameters. Such a selective routing by an intermediate DNS classifier allows, a same domain name to be routed and resolved in different ways based on the characteristics of the requesting instance. For example, the instance 162 within the virtual network 164 asking for a DNS request including the domain name Amazon.com® can receive a different IP address than the instance 160 which is outside of a virtual network. Indeed, the DNS classifier 110 can route the requests from the instance 162 to the private DNS server computer 140 whereas the instance 160 has its request routed to the public DNS server computer 150. As a result the same domain name can resolve to different IP addresses and, in the case of the private DNS server computer, the customer 180 can customize the returned IP address based on the received parameters associated with the requester's geographic and logical location information.

The private DNS server can be within the control of the service provider 100 or it can be controlled by the customer. Thus, the customer can setup a private DNS server so as to resolve requests in a manner desirable by the customer.

Typically, such customization occurs using APIs between web services as is shown at 182. Web services are commonly used in cloud computing. A web service is a software function provided at a network address over the web or the cloud. Clients initiate web service requests to servers and servers process the requests and return appropriate responses. The client web service requests are typically initiated using, for example, an API request. For purposes of simplicity, web service requests will be generally described below as API requests, but it is understood that other web service requests can be made. An API request is a programmatic interface to a defined request-response message system, typically expressed in JSON or XML, which is exposed via the web—most commonly by means of an HTTP-based web server. Thus, in certain implementations, an API can be defined as a set of Hypertext Transfer Protocol (HTTP) request messages, along with a definition of the structure of response messages, which can be in an Extensible Markup Language (XML) or JavaScript Object Notation (JSON) format. The API can specify a set of functions or routines that perform an action, which includes accomplishing a specific task or allowing interaction with a software component. When a web service receives the API request from a client device, the web service can generate a response to the request and send the response to the endpoint identified in the request.

Figure 2:
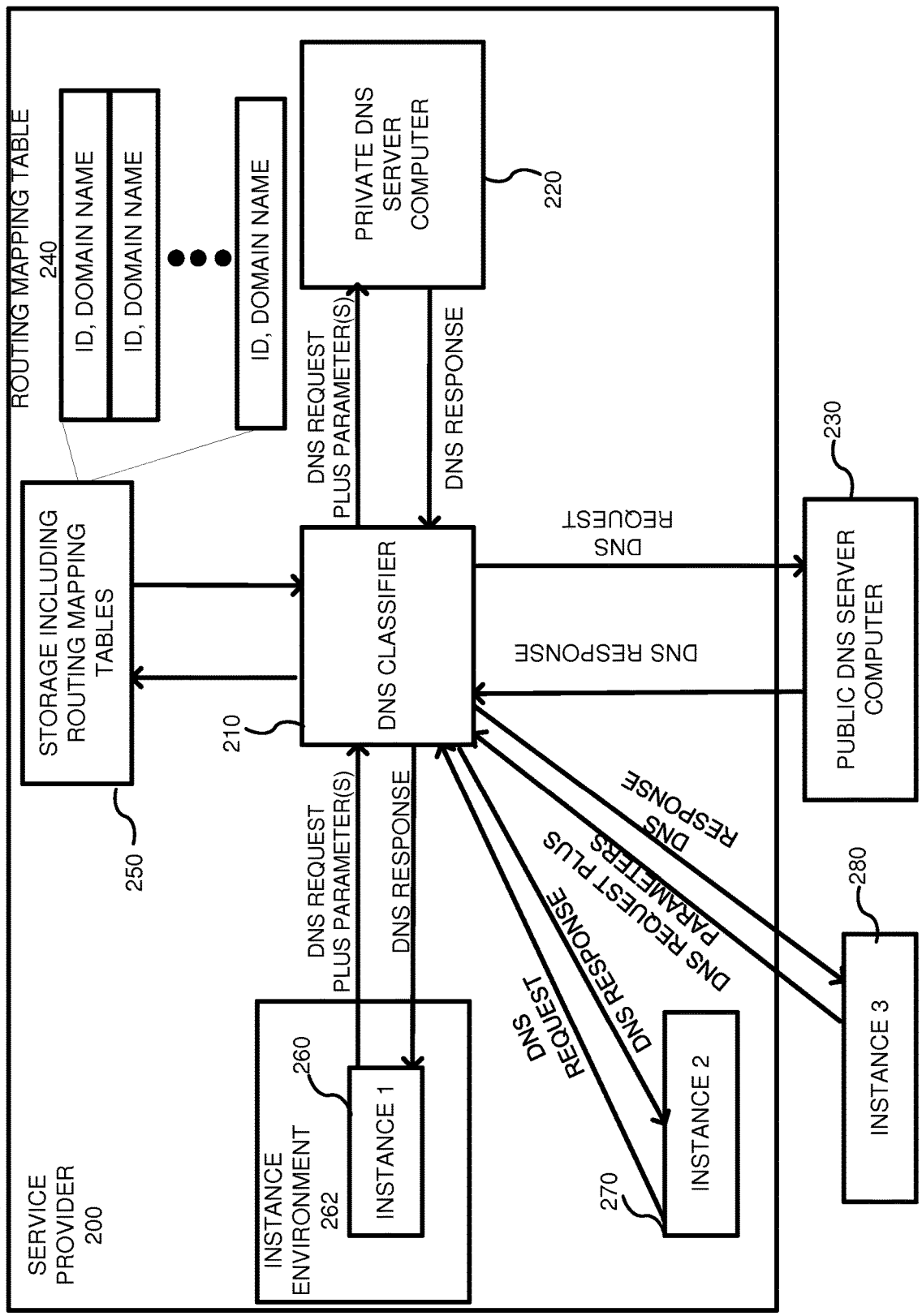
FIG. 2 shows the DNS classifier routing requests differently based on whether the request comes from within a virtual network or outside of a virtual network.

FIG. 2 shows a service provider 200 including a DNS classifier server computer 210 and a private DNS server computer 220. In this example, the DNS classifier 220 is shown simply routing DNS requests to either the private DNS server computer 220 or to a public DNS server computer 230 using routing tables 240 stored in storage 250. In this case, an instance 260 can have an identifier associated therewith. For example, the identifier can be an identifier associated with an instance environment 262 or other identifier associated with a characteristic of the instance 260. Example characteristics of the instance include a logical or geographic location in which the instance is executing, or other association between the instance 260 and a customer of the service provider 200. The instance 260 can make a DNS query that is passed to the DNS classifier 210. The DNS query includes a domain name and can include the identifier associated with the instance. Alternatively, the DNS classifier can derive the identifier from the request by using a simple lookup. The DNS classifier 210 can use the identifier and the domain name to search within the routing tables 240 stored in storage 250. If a match is found, the DNS classifier 210 can forward the DNS query from instance 260 to the private DNS server computer 220. The private DNS server computer 220 then can perform a lookup using the identifier and the domain name to determine an address to which the DNS query resolves. That address can be returned to the DNS classifier and then to the instance 260 as a DNS response. Alternatively, if the address of the instance 260 is passed from the DNS classifier 210 to the DNS server computer 220, then the private DNS server computer can return the address response directly to the instance 260, bypassing the DNS classifier 210. In contrast, an instance 270 can have its DNS query routed by the DNS classifier to a public DNS server computer 230. In this case, the instance 270 provides a domain name which is not within the routing mapping tables 240. Alternatively, the instance 270 may not have an identifier associated with it. In still another alternative, the instance 270 can have an identifier which is not located within the routing mapping table 240. In whatever manner it occurs, the DNA classifier 210 does not find a match between the DNS query from the instance 270 with an entry within the routing mapping table 240. Consequently, the DNS classifier 210 routes the DNS query as a standard DNS query to the public DNS server computer 230 that is typically located outside of the service provider 200. A response may then be passed from the public DNS service computer 230 back to the instance 270 directly or via the DNS classifier 210.

Instances can also reside outside of the service provider 200, such as is the case with an instance 280. The instance 280 can be executing on a server computer outside of the service provider and its DNS requests can be routed by the DNS classifier 210 to the private DNS server computer 220 or the public DNS server computer 230 based on whether the classifier matches the DNS request and additional parameters associated with the request in the routing mapping table 240.

Figure 3:
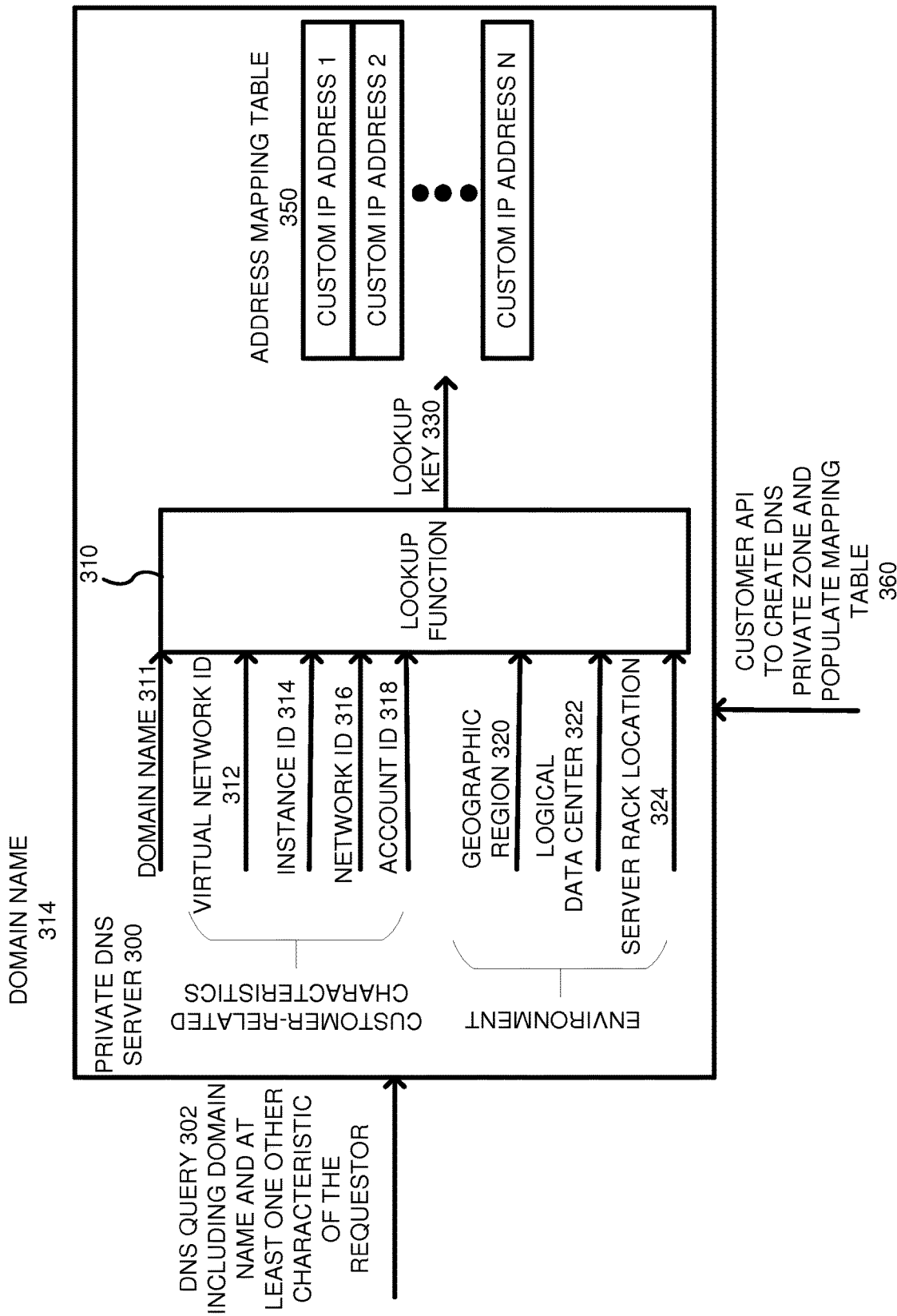
FIG. 3 is an example showing details of a private DNS server that performs a DNS resolution lookup using multiple input variables including a domain name.

FIG. 3 provides more details of the private DNS server 300. As shown, the private DNS server 300 receives a DNS query 302 including a domain name and at least one other characteristic of the requesting instance, such as an identifier, a geographic region, a logical data center, etc. Generally, the parameters can be customer-related characteristics, such as a virtual network identifier 312, an instance identifier 314, a network identifier 316, an account identifier 318, etc. and environment-based parameters, such as a geographic region 320, a logical data center 322, and a server location 324. Such characteristics or parameters can be parsed by the private DNS server and supplied to a lookup function 310. The lookup function 310 can use one or more of a domain name 311 and the above-mentioned customer-related characteristics or environmental parameters. Any or all of these parameters can be used for the lookup function to generate a lookup key 330. Examples of the lookup function can include any function that is similar to a hash function. The function 310 can take a concatenation of the various input parameters and use the concatenation to generate the lookup key which is typically numeric in nature. The lookup key 330 can be used to search within an address mapping table 350 in order to identify the custom IP address used to resolve the DNS query. Once found, the custom IP address is returned by the private DNS server to the instance making the request, either directly or through the DNS classifier. As shown at 360, a customer can submit an API to the private DNS server 300 to create private DNS zones and populate the mapping table 350. Thus, a customer can customize which IP address is returned using any or all combinations of the input parameters. Using this unique mapping, a customer can have a same domain name 311 resolve to different custom IP addresses depending on the input parameters to the lookup function 310.

Figure 4:
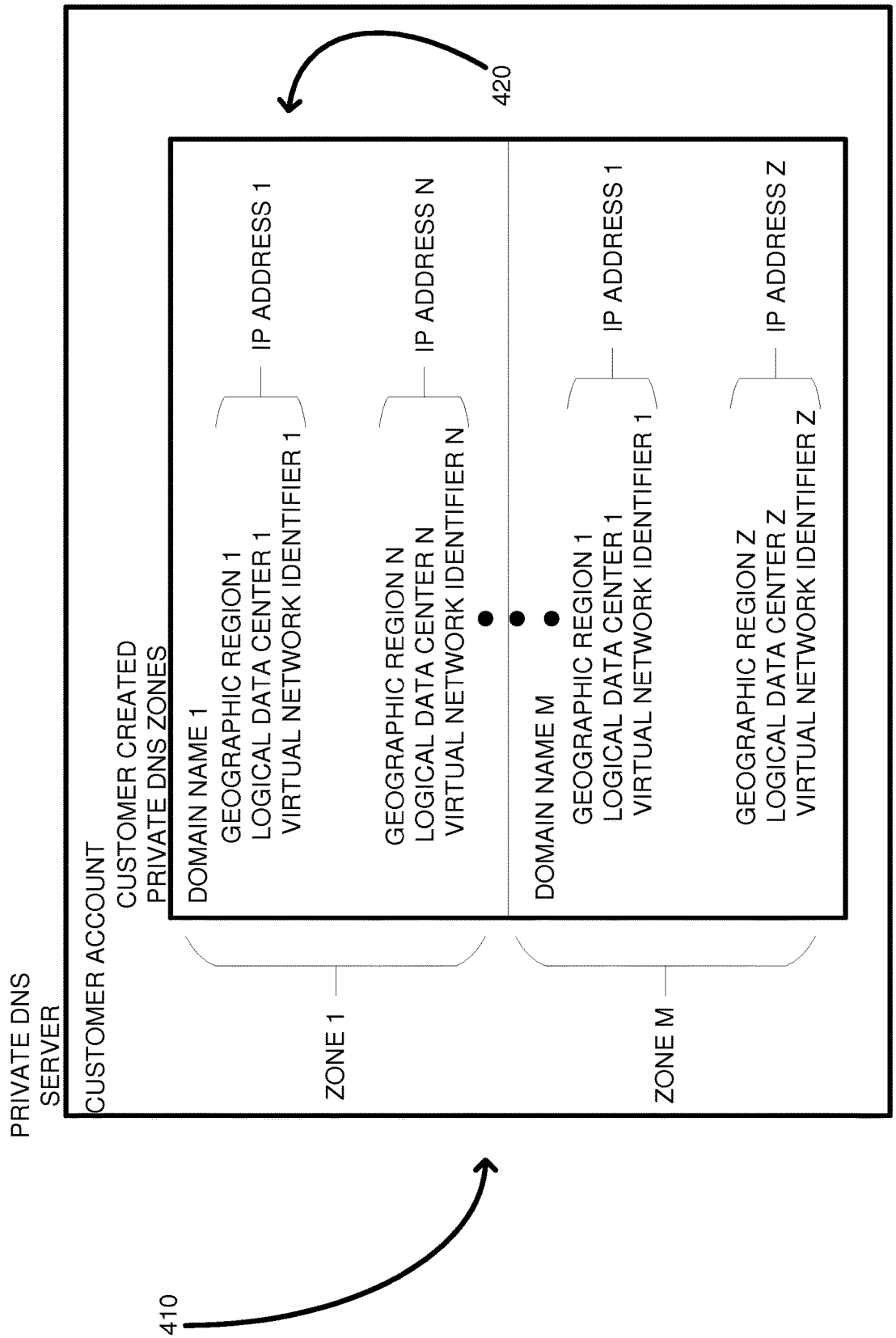
FIG. 4 illustrates an example structure used for the private DNS server including multiple customer-created private DNS zones.

FIG. 4 shows an example of a data structure used in the private DNS server 300. A customer account can have multiple private DNS hosted zones, such as zone 1 through zone M (where M is any integer number), shown generally at 410. The private DNS hosted zones can be customized by a customer using APIs, for example. Each zone is typically associated with one domain name. For example, zone 1 is shown as associated with domain name 1 (e.g., foo.com). The domain name associated with one zone can resolve to different IP addresses 1 through N (where N is any number) as shown at 420. In particular, any of a plurality of characteristics associated with the requester can be used to resolve a DNS request differently. The examples show that a request being received and associated with a virtual network identifier 1, a logical data center 1 and/or a geographic region 1, resolves to IP address 1. A similar combination is shown for IP address N. Thus, a same domain name can resolve to different IP addresses based on a virtual identifier, a geographic region, or a logical data center. Additionally, any domain name in the private DNS zones can be conflicting with domains in a public DNS server. However, the classifier can route requests to the private DNS server as a priority over the public server. As an example, foo.com can be routed to a public DNS server or the private DNS server, and the customer can control how the resolution occurs by forcing routing to the private DNS server instead of the public DNS server. Depending on the DNS server chosen, a different IP address is returned.

Figure 5:
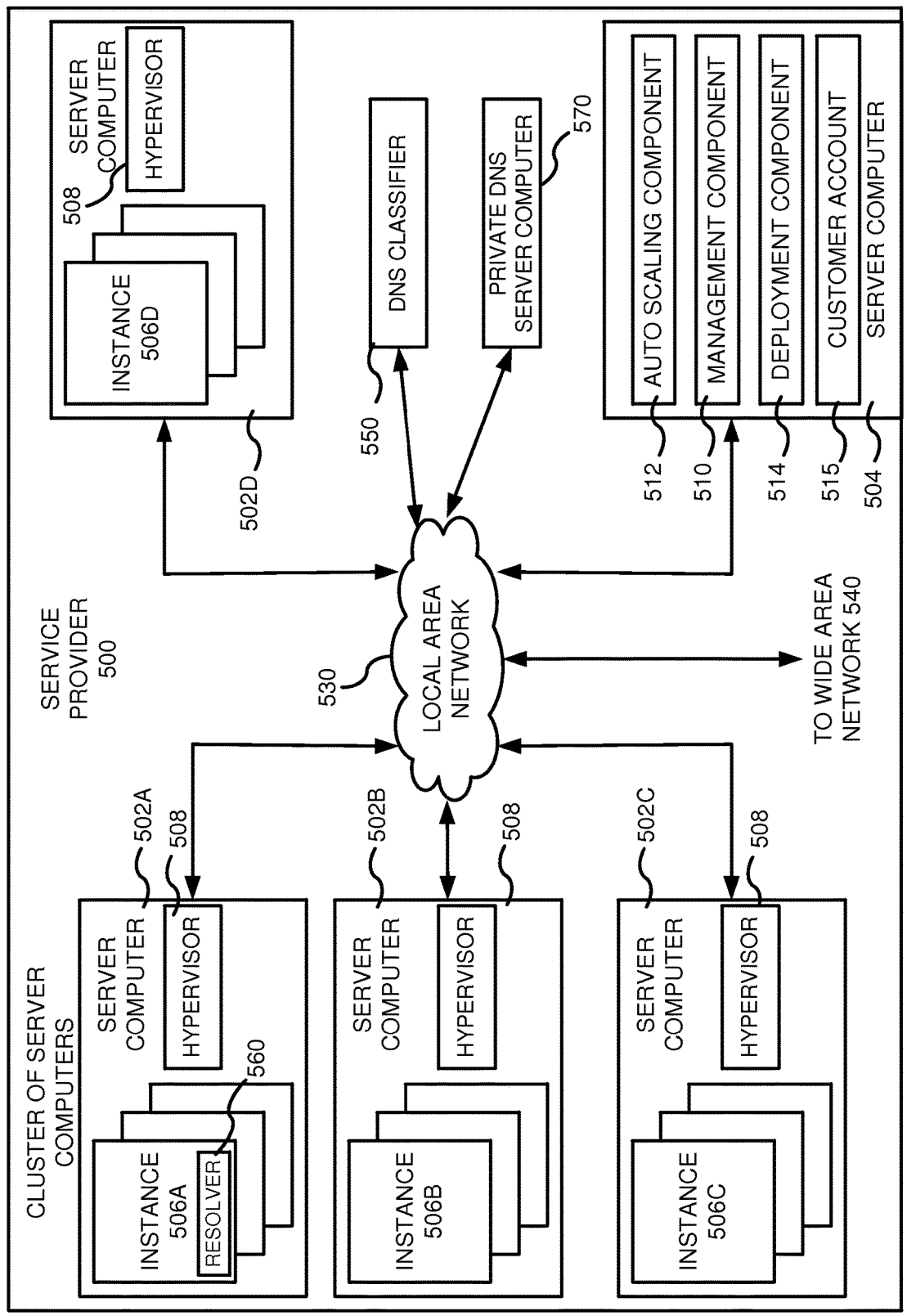
FIG. 5 is an example system diagram showing a plurality of virtual machine instances running in a multitenant environment of the service provider.

FIG. 5 is a computing system diagram of a network-based compute service provider 500 that illustrates one environment in which embodiments described herein can be used. By way of background, the compute service provider 500 (i.e., the cloud provider) is capable of delivery of computing and storage capacity as a service to a community of end recipients. In an example embodiment, the compute service provider can be established for an organization by or on behalf of the organization. That is, the compute service provider 500 may offer a "private cloud environment." In another embodiment, the compute service provider 500 supports a multi-tenant environment, wherein a plurality of customers operate independently (i.e., a public cloud environment). Generally speaking, the compute service provider 500 can provide the following models: Infrastructure as a Service ("IaaS"), Platform as a Service ("PaaS"), and/or Software as a Service ("SaaS"). Other models can be provided. For the IaaS model, the compute service provider 500 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 500 using networked client devices, such as desktop computers, laptops, tablets, smartphones, etc. running web browsers or other lightweight client applications. Those skilled in the art will recognize that the compute service provider 500 can be described as a "cloud" environment.

The particular illustrated compute service provider 500 includes a plurality of server computers 502A-502D. While only four server computers are shown, any number can be used, and large centers can include thousands of server computers. The server computers 502A-502D can provide computing resources for executing software instances 506A-506D. In one embodiment, the instances 506A-506D are virtual machines. As known in the art, a virtual machine is an instance of a software implementation of a machine (i.e. a computer) that executes applications like a physical machine. In the example of virtual machine, each of the servers 502A-502D can be configured to execute a hypervisor 508 or another type of program configured to enable the execution of multiple instances 506 on a single server. Additionally, each of the instances 506 can be configured to execute one or more applications.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 504 can be reserved for executing software components for managing the operation of the server computers 502 and the instances 506. For example, the server computer 504 can execute a management component 510. A customer can access the management component 510 to configure various aspects of the operation of the instances 506 purchased by the customer. For example, the customer can purchase, rent or lease instances and make changes to the configuration of the instances. The customer can also specify settings regarding how the purchased instances are to be scaled in response to demand. The management component can further include a policy document to implement customer policies. An auto scaling component 512 can scale the instances 506 based upon rules defined by the customer. In one embodiment, the auto scaling component 512 allows a customer to specify scale-up rules for use in determining when new instances should be instantiated and scale-down rules for use in determining when existing instances should be terminated. The auto scaling component 512 can consist of a number of subcomponents executing on different server computers 502 or other computing devices. The auto scaling component 512 can monitor available computing resources over an internal management network and modify resources available based on need.

A deployment component 514 can be used to assist customers in the deployment of new instances 506 of computing resources. The deployment component can have access to account information associated with the instances, such as who is the owner of the account, credit card information, country of the owner, etc. The deployment component 514 can receive a configuration from a customer that includes data describing how new instances 506 should be configured. For example, the configuration can specify one or more applications to be installed in new instances 506, provide scripts and/or other types of code to be executed for configuring new instances 506, provide cache logic specifying how an application cache should be prepared, and other types of information. The deployment component 514 can utilize the customer-provided configuration and cache logic to configure, prime, and launch new instances 506. The configuration, cache logic, and other information may be specified by a customer using the management component 510 or by providing this information directly to the deployment component 514. The instance manager can be considered part of the deployment component.

Customer account information 515 can include any desired information associated with a customer of the multi-tenant environment. For example, the customer account information can include a unique identifier for a customer, a customer address, billing information, licensing information, customization parameters for launching instances, scheduling information, auto-scaling parameters, and previous IP addresses used to access the account, etc.

A network 530 can be utilized to interconnect the server computers 502A-502D and the server computer 504. The network 530 can be a local area network (LAN) and can be connected to a Wide Area Network (WAN) 540 so that end users can access the compute service provider 500. It should be appreciated that the network topology illustrated in FIG. 5 has been simplified and that many more networks and networking devices can be utilized to interconnect the various computing systems disclosed herein.

A DNS classifier 550 can be an independent server computer within the service provider 500 and can receive domain name requests from the instances 506. In an alternative embodiment, the DNS classifier 550 can execute on the server computer 502, such as in the hypervisor. In particular, a resolver 560 executing on an instance can direct DNS requests to the DNS classifier 550, which can in turn either redirect the request to the Internet through the local area network 530 or to a private DNS server computer 570. The private DNS server computer 570 can resolve the request and respond directly to the resolver 560 or via the DNS classifier 550.

Figure 6:
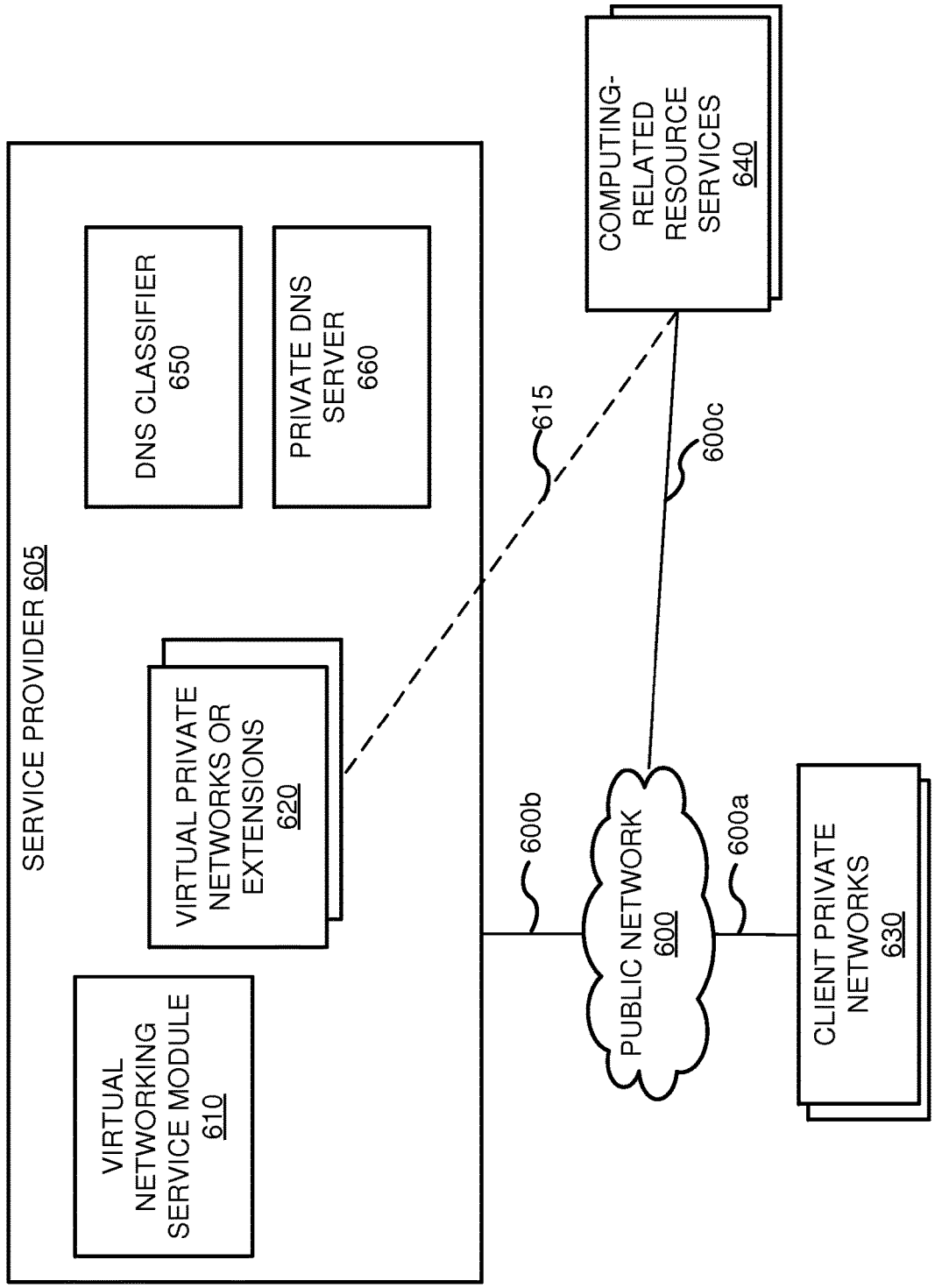
FIG. 6 is a network diagram illustrating example embodiments of interactions that involve remote clients creating and configuring private virtual networks within the service provider.
Figure 7:
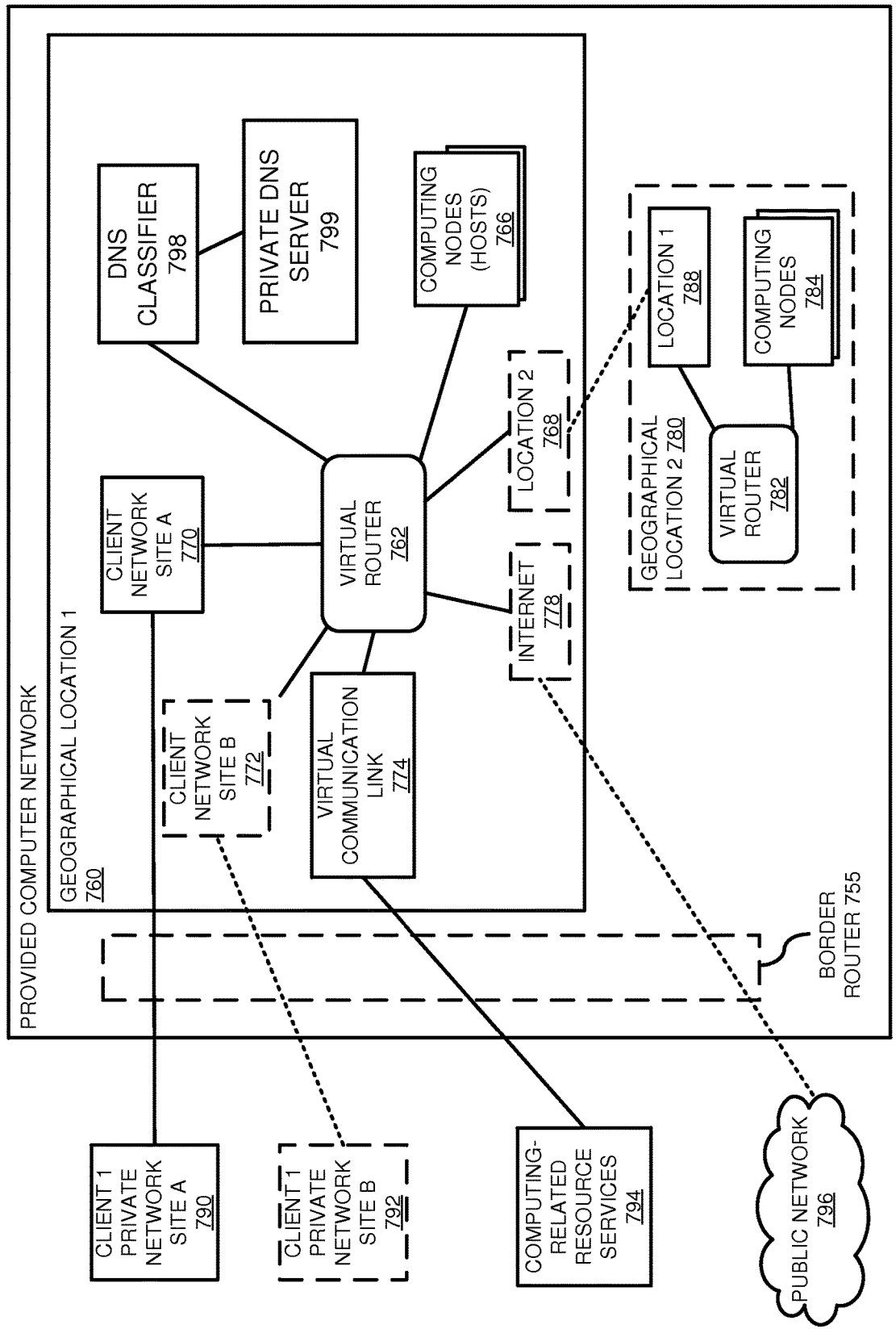
FIG. 7 expands on the creation and configuration of FIG. 6.

FIGS. 6 and 7 are network diagrams illustrating example embodiments of interactions that involve remote clients creating and configuring private computer networks within a service provider. FIG. 6 is a network diagram illustrating an example embodiment of a service provider 605 that enables remote clients to create and configure computer networks for use by the clients. In this example, the computer networks that are created and configured are virtual private networks or extensions to existing private computer networks of clients, and a service provider 605 provides such functionality to clients (not shown) over one or more public networks 600 (e.g., over the Internet). Thus, the remote clients may dynamically modify the size and/or capabilities of their private computer networks, such as by using cloud computing techniques over the public networks 600.

In particular, in the example of FIG. 6, a number of clients (not shown) are interacting over a public network 600 with a Virtual networking service module 610 to create and configure various virtual private networks or private computer network extensions 620 to remote existing client private networks 630, with at least some of the computer virtual private networks or extensions 620 being configured to enable secure private access from one or more corresponding client private networks 630 over the public network 600 (e.g., via VPN connections established over inter-connections 600a and 600b). In this example embodiment, the Virtual networking service module 610 assists in providing functionality of the service provider 605 to the remote clients, such as in conjunction with various other modules (not shown) and various computing nodes and networking devices (not shown) that are used by the service provider 605 to provide the virtual private networks or extensions 620. In at least some embodiments, the Virtual networking service module 610 may execute on one or more computing systems (not shown), and may provide one or more APIs that enable remote computing systems to programmatically interact with the module 610 to access some or all functionality of the service provider 605 on behalf of clients (e.g., to create, configure, and/or initiate use of virtual private networks or extensions 620). In addition, in at least some embodiments, clients may instead manually interact with the module 610 (e.g., via a user interface provided by the module 610) to perform some or all such actions.

The public network 600 may be, for example, a publicly accessible network of linked networks, possibly operated by distinct parties, such as the Internet. The remote client private networks 630 may each include one or more existing private networks, such as a corporate or other private network (e.g., home, university, etc.) that is partially or wholly inaccessible to non-privileged users, and that includes computing systems and/or other networked devices of a client.

In the illustrated example, the provided virtual private networks 620 each include multiple computing nodes (not shown), at least some of which are provided by or otherwise under the control of the service provider 605, and each of the provided virtual private networks or extensions 620 may be configured in various ways by the clients for whom they are provided. Each of the virtual private networks or extensions 620 in the illustrated embodiment may be a private computer network that is accessible only by the client that creates it, although in other embodiments at least some computer networks provided by the service provider 605 for clients may be publicly accessible and/or may be standalone computer networks that are not extensions to other existing computer networks. Similarly, while the provided computer networks 620 in the example are extensions to remote client computer networks 630 that are private networks, in other embodiments the provided computer networks 620 may be extensions to client computer networks 630 that are not private networks.

Private access between a remote client private computer network 630 and corresponding private computer network extension 620 provided for a client may be enabled in various ways, such as by establishing a VPN connection or other secure connection between them that allows intercommunication over the public network 600 in a secure private manner. For example, the service provider 605 may automatically perform appropriate configuration on its computing nodes and other computing systems to enable VPN access to a particular private network extension 620 of a client, such as by automatically configuring one or more VPN mechanisms hosted by the service provider 605 (e.g., software and/or hardware VPN mechanisms), and/or may automatically provide appropriate configuration information to the client (e.g., credentials, access points, and/or other parameters) to allow a VPN mechanism hosted on the remote client private network 630 to establish the VPN access. After VPN access has been appropriately enabled and/or configured, a VPN connection may be established between the remote client private network and the private network extension, such as initiated by the client using IPsec ("Internet Protocol Security") or other appropriate communication technologies. For example, in some embodiments, a VPN connection or other secure connection may be established to or between networks that use MPLS ("Multi Protocol Label Switching") for data transmission, such as instead of an IPsec-based VPN connection.

In addition, in the illustrated embodiment, various network-accessible remote resource services 640 are available to remote computing systems over the public network 600, including to computing systems on the remote client private networks 630. The resource services 640 may provide various functionality to the remote computing systems, such as for at least some of the resource services 640 to provide remote computing systems with access to various types of computing-related resources. Furthermore, at least some of the virtual private networks or extensions 620 that are provided by the service provider 605 may be configured to provide private or other specialized access to at least some of the remote resource services 640, with that provided access optionally appearing to computing nodes of the virtual private networks or extensions 620 as being locally provided via virtual connections 615 that are part of the virtual private networks or extensions 620, although the actual communications with the remote resource services 640 may occur over the public networks 600.

In addition, in at least some embodiments, a client may interact with the module 610 to configure network addresses for a computer network provided for the client (e.g., via one or more programmatic interactions with an API provided by the service provider 605), and network addresses may later be dynamically added, removed or modified for a provided computer network of a client in at least some such embodiments, such as after the provided computer network has already been in use by the client. For example, if a particular provided computer network that is being configured is an extension to an existing remote client computer network, the client may specify one or more address ranges (e.g., a Classless Inter-Domain Routing ("CIDR") address block) or other groups of network addresses that are a subset of the network addresses used by the existing remote client computer network, such that the specified network addresses are used for the computing nodes of the provided computer network. Such configured network addresses may in some situations be virtual or private network addresses that are not directly addressable from computing systems on the public network 600 (e.g., if the existing remote client computer network and the corresponding provided network extension use network address translation techniques and/or virtual networking techniques for the client computer network and its provided network extension), while in other situations at least some of the configured network addresses may be public network addresses that are directly addressable from computing systems on the public network 600 (e.g., a public network address that is a static Internet-routable IP address or other non-changing network address).

In other embodiments, the service provider 605 may automatically select network addresses to be used for at least some computing nodes of at least some provided computer network extensions, such as based on network addresses that are available for use by the service provider 605, based on selecting network addresses that are related network addresses used by remote existing computer networks corresponding to the provided computer networks, etc. In addition, in at least some embodiments in which the service provider 605 provides virtual networks to clients, such as by using overlay networks on a substrate network, each client may be allowed to specify any network addresses to be used for their provided computer networks, even if multiple clients specify the same or overlapping network addresses for their respective provided computer networks—in such embodiments, the service provider 605 manages the network addresses distinctly for each client, such that a first client may have a first computing node associated with a particular specified network address for the first client's provided computer network, while a distinct second client may have a distinct second computing node associated with the same particular specified network address for the second client's provided computer network.

Once network addresses are configured or otherwise determined for a provided computer network, the service provider 605 may assign the network addresses to various of the computing nodes selected for the provided computer network, such as in a random manner, by using DHCP ("Dynamic Host Configuration Protocol") or other techniques for dynamic assignment of network addresses, etc. In addition, even if public network addresses are used for a particular computer network, the service provider 605 may map one or more of those public network addresses for use in other manners, such as to use a particular public network address to act as an access mechanism for a particular remote resource service so that communications sent to that particular public network address by computing nodes of that particular computer network will be forwarded to the corresponding remote resource service rather than to another computing system on the Internet or other network to which that particular public network address is assigned. FIG. 7 provides additional details regarding an example of using configured network addresses to route communications within a provided computer network.

The service provider 605 can include a DNS classifier 650 and a private DNS server 660 similar to those described in the earlier figures. DNS requests from host server computers within the virtual private networks 620 can be routed to the DNS classifier 650 and it can selectively decide whether to forward those requests to the private DNS server 660 or to a public DNS server based on a variety of parameters already discussed.

In addition, in at least some embodiments, a client may interact with the module 610 to configure network topology information for a computer network provided for the client (e.g., via one or more programmatic interactions with an API provided by the service provider 605), and such network topology information may later be dynamically modified for a provided computer network in at least some such embodiments, such as after the provided computer network has already been in use by the client. For example, a client may specify particular types of networking devices (e.g., routers, switches, etc.) and/or other network devices or nodes (e.g., firewalls, proxies, network storage devices, printers, etc.) to be part of the provided computer network, and/or may specify subsets of the computing nodes of the provided computer network to be grouped together or that are to otherwise share common intercommunication characteristics (e.g., a particular subset of computing nodes that are part of a subnet for which intercommunications are not filtered and/or that are associated with a particular networking device).

In addition, the specified configuration information for a provided computer network may in at least some embodiments include routing information or other interconnectivity information between networking devices and/or groups of computing devices. Furthermore, in at least some embodiments, the service provider 605 may provide available computing nodes in multiple geographical locations (e.g., in multiple geographically distributed data centers), and the configuration information specified by a client for a provided computer network may further indicate one or more geographical locations in which computing nodes of the provided computer network are to be located (e.g., to provide fault tolerance among the computing nodes of a provided computer network by having them located in multiple geographical locations), and/or may otherwise provide information about preferences or requirements of how the computing nodes of the provided computer network are to interoperate that is used by the service provider 605 to select one or more such geographical locations (e.g., minimum or maximum network latency or bandwidth for computing node intercommunications; minimum or maximum network proximity between computing nodes; minimum or maximum geographic proximity between computing nodes; having local access to particular resources or functionality that is not available in all such geographic locations; having specified locations relative to other external computing systems, such as to a remote computer network of the client and/or to a remote resource service; etc.).

FIG. 7 illustrates additional details regarding an example computer network that may be provided by the service provider 605 (or other embodiment of a service provider) for a client, with the provided computer network in this example the virtual private network is a private network extension to a remote private computer network of the client. The provided computer network includes various computing nodes 766 (or host server computers) provided by the service provider 605 that are located at a first geographical location 1 760 (e.g., at a first data center at the geographical location 1). In this example, a single conceptual virtual router 762 is shown at geographical location 1 to control communications between those computing nodes and other computing systems, so as to illustrate different types of communications that may occur, although the provided computer network may actually have multiple or no configured networking devices at geographical location 1, and the computer network may be implemented by the configurable network service at the geographical location 1 in various manners, such as via multiple physical interconnected routers or other networking devices, by using an underlying substrate network and associated modules that control communications over the underlying substrate network, etc. In this example, the virtual router 762 operates in accordance with the configured information for the provided computer network, including configured network topology information, configured private or other specialized access to remote resource services, and other configured network access constraint information, such as to route communications that are sent to network addresses within the provided computer network to corresponding destination computing nodes on the provided computer network, and to route other communications to other network addresses outside of the provided computer network as appropriate.

In this example, the computer network is provided for an example Client 1, and is a network extension to a remote computer network of Client 1. Client 1's remote computer network includes multiple computing systems (not shown) at a first remote location Site A 790, and the virtual router 762 is configured to communicate with those multiple computing systems via a virtual communication link 770 at the geographical location 1. For example, the provided computer network may include one or more configured VPN connections to the multiple computing systems at Site A 790, and the communication link 770 may correspond to one or more such VPN connections. In addition, the remote computer network of Client 1 may optionally include computing systems at one or more other locations, such as the illustrated optional Site B 792, and if so the virtual router 762 may further be configured to communicate with those other computing systems at the other locations, such as via an optional virtual communication link 772 to Site B 792.

When multiple VPN connections or other secure connections are used to remote computing systems of a remote computer network, each connection may correspond to a subset of the remote computing systems (e.g., by being associated with a subset of the network addresses of the remote computer network that correspond to those remote computing systems), so as to cause communications to be routed to the appropriate connection. In other embodiments, multiple VPN connections or other secure connections may be used to remote computing systems at one or more locations, but may each support communications to any of the remote computing systems, such as if the multiple connections are redundant alternatives (e.g., used for load balancing). Furthermore, in some embodiments, a client's remote computer network may include multiple computing systems at multiple sites, but only a single VPN connection or other secure connection to the remote computing systems may be used, with the remote computer network being responsible for routing the communications to the appropriate site and computing system.

In addition, the provided computer network may be configured to allow all, some or no communications between the computing nodes of the provided computer network and other external computing systems that are generally accessible on the Internet 796 or other public networks. If at least some such external communications are allowed, the virtual router 762 may further be configured to communicate with those external multiple computing systems via an optional virtual communication link 778 of the provided computer network, such as in conjunction with an optional virtual border router 755 for the provided computer network. The virtual border router 755 may be physically implemented in various manners, such as by the service provider 605 using one or more actual firewall devices or border router devices that manage communications between external computing systems and the various computing nodes provided by the service provider 605 at geographical location 1 (e.g., actual devices that support numerous computer networks to clients that use those computing nodes), by using an underlying substrate network and associated modules that control communications over the underlying substrate network (e.g., to prevent disallowed communications from being sent by computing nodes of the provided computer network onto the substrate network), etc. In addition, the provided computer network may be configured to provide private or other specialized access to one or more remote resource services, such as by assigning one or more network addresses of the provided computer network to represent those one or more remote resource services, and by optionally configuring particular actions to be taken for communications sent to those assigned network addresses. In this example, the virtual router 762 has been configured to provide local access to remote resource service 794 via a virtual communication link 774 of the provided computer network. Thus, for example, if one of the computing nodes of the provided computer network sends a communication to a particular network address that is mapped to the communication link 774, the virtual router may forward that communication to the remote resource service 794 external to the provided computer network (e.g., via the Internet or other public networks).

In addition, the virtual communication link 774 may be configured in at least some embodiments to manage communications sent via the link in various manners, such as to modify those communications in one or more manners before they are forwarded to the remote resource service 794, or to otherwise access the remote resource service 794 in a specialized manner. For example, in the illustrated embodiment, the virtual communication link 774 may be configured to correspond to a particular namespace within the remote resource service 794, with a subset of the computing-related resources provided by the remote resource service 794 being part of that namespace. Accordingly, the virtual communication link 774 may be configured to access resources within the particular namespace, such as by modifying or translating communications to use a name or other identifier associated with the particular namespace, by using a particular interface of the remote resource service that supports indicating a particular namespace, etc.

In addition, if the virtual communication link 774 is configured to correspond to a particular namespace or to otherwise correspond to a subset of the resources provided by the remote resource service 794, the provided computer network may optionally be further configured to include one or more other virtual communication links that also correspond to the same remote resource service 794 but are configured to access the remote resource service 794 in other manners. In addition to or instead of configuring the virtual communication link 774 to access a particular namespace of the remote resource service 794, the virtual communication link may be configured in at least some embodiments to provide additional information to the remote resource service 794 to allow the remote resource service to validate the location or other source of the communications as being the provided computer network. For example, in the illustrated embodiment, the virtual communication link 774 may be configured to correspond to one or more particular identifiers or other access control indicators that are associated with the provided computer network by the service provider or by the remote resource service 794 so that a subset of new and/or existing computing-related resources provided by the remote resource service 794 that are accessed via the virtual communication link 774 are associated with the access control indicator(s), for use by the remote resource service 794 in restricting access to those resources.

In the illustrated embodiment, in addition to the computing nodes of the service provider 605 at geographical location 1, the provided computer network may further include computing nodes 784 provided by the service provider 605 that are located at a second geographical location 2 780 (e.g., at a distinct second data center at the geographical location 2). Accordingly, the virtual router 762 may be configured to include an optional virtual communication link 768 to the portion of the provided computer network at the geographical location 2. In this example, the portion of the provided computer network at the geographical location 2 similarly is illustrated with a conceptual virtual router 782 to manage communications to and from the computing nodes 784, including to communicate with the portion of the provided computer network at the geographical location 1 via a virtual communication link 788. Such communications between computing nodes of the service provider 605 at different geographical locations may be handled in various manners in various embodiments, such as by sending the communications over the Internet or other public networks (e.g., as part of a secure tunnel, such as that uses encryption supported by the service provider 605), by sending the communications in a private secure manner (e.g., via a dedicated lease line between the geographical locations), etc. In addition, while not illustrated here, the portion of the provided computer network at the geographical location 2 may similarly include some or all of the same types of other virtual communication links illustrated for the portion at geographical location 1, such as to a remote client private network (e.g., via one or more VPN connections distinct from any VPN connections to the geographical location 1), to remote resource services, to the Internet, etc.

It will be appreciated that the example provided computer network of FIG. 7 is included for exemplary purposes, and that other computer networks provided by the service provider 605 for clients may not include all of the types of configured communications links and network topology information, and/or may include other types of configured communications links and network topology information that is not illustrated here. For example, in some embodiments and situations, a provided computer network may include configured devices and other resources in addition to or instead of computing nodes, and if so, each such other resource may optionally be assigned a network address of the provided computer network. Furthermore, the conceptual devices and communication links may be implemented using a variety of types of underlying physical devices, connections and modules. In addition, while not illustrated here, clients may perform a variety of other types of interactions with remote resource services, whether from provided computer networks or instead other remote computing systems, such as to subscribe/register to use resource, receive/create various credentials (e.g., user IDs, passwords, etc.), create resources and/or namespaces from other remote computing systems (e.g., that are part of a remote private corporate network) that are later accessed from a provided computer network (e.g., a network extension to the private corporate network), etc.

The service provider can include a DNS classifier 798 and a private DNS server 799 similar to those described in the earlier figures. DNS requests from the computing nodes 766 within the virtual private networks can be routed to the DNS classifier 798 and it can selectively decide whether to forward those requests to the private DNS server 799 or to a public DNS server based on a variety of parameters already discussed.

Figure 8:
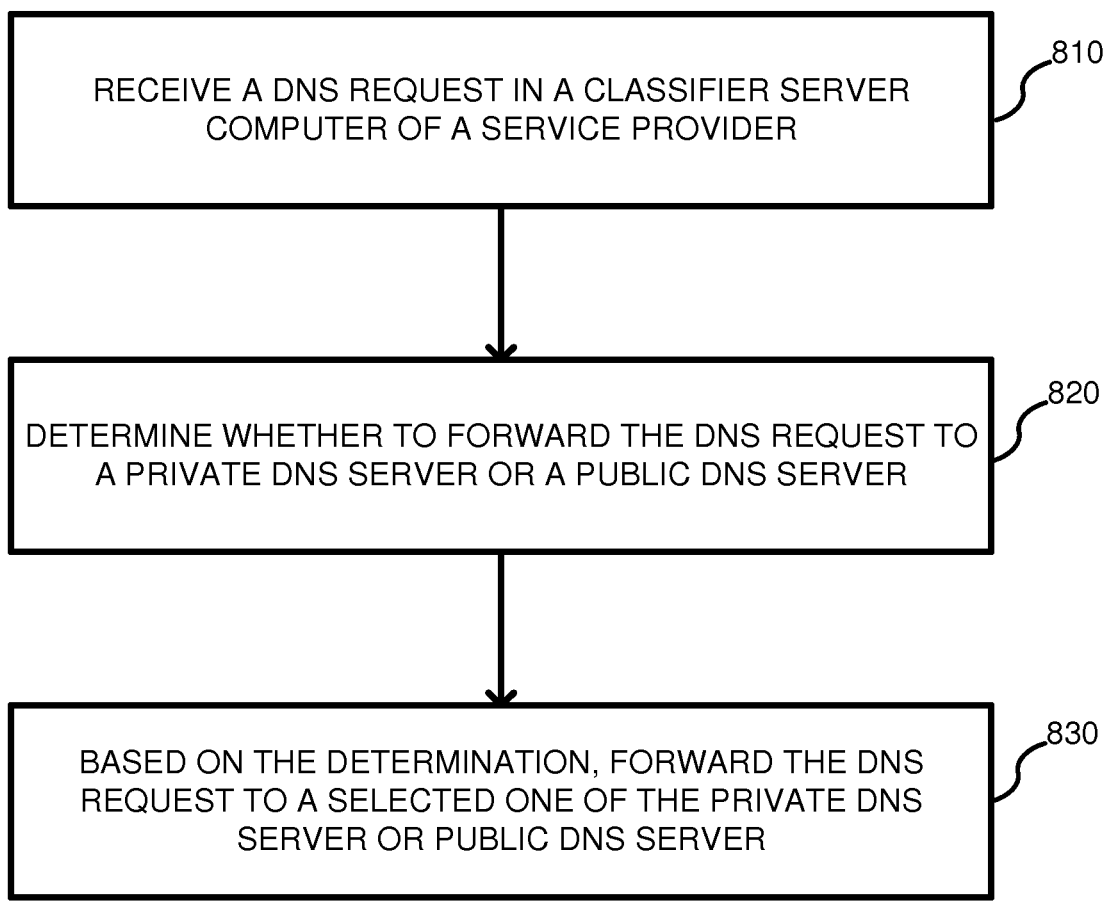
FIG. 8 is a flowchart according to one embodiment for selectively routing DNS requests.

FIG. 8 is a flowchart of a method for selectively routing domain name system requests. In process block 810 a DNS request is received in a classifier server computer of a service provider. Typically, the DNS request includes at least a domain name to be resolved into an IP address. In one example, a virtual machine instance running in a service provider environment includes a client resolver that determines where to send DNS requests. In this example, the client resolver sends the DNS request to a classifier server computer within the service provider which is offered as a service in the multitenant environment of the service provider. In process block 820, a determination is made whether to forward the DNS request to a private DNS server within the service provider or to a public DNS server outside of the service provider. Typically, the public DNS server stores publicly available domain names that are registered domain names with a domain name registrar that is independent of the service provider. By contrast, the private DNS server includes domain names that are not registered with the domain name registrar and are maintained solely within the service provider environment. The determination in process block 820 can be made in a variety of ways, but one way is to use an identifier associated with the requester and perform a lookup to determine whether the identifier and domain name are mapped to the private DNS server. In process block 830, based on the determination, the DNS request can be forwarded to a selected one of the private DNS server or the public DNS server. As is well understood in the art, the private DNS server can include a group of DNS servers and likewise a public DNS server can include a group of DNS servers necessary to support the volume of requests. In the case of forwarding the DNS request to the public DNS server, the request can be forwarded as is (as it was received) to the public DNS server. By contrast, forwarding the DNS request to the private DNS server can require inserting additional parameters that define the characteristics of the requester such as an identifier associated with the requester, a geographic region in which the requester is executing, a logical data center in which the requester is executing, etc. How the DNS classifier server computer determines which path to forward the DNS request is based on how a customer associated with the requester configured private DNS zones within the service provider. For example, a customer can request to configure a private DNS zone associated with a virtual network within the service provider. Additionally, the customer can associate an identifier of a virtual network with the private DNS zone. The customer can further associate an IP address to resolve based on the identifier and the domain name. The customer can associate multiple virtual networks with a DNS hosted zone and the customer can have multiple DNS hosted zones. Typically, only one domain name is used per DNS hosted zone.

Figure 9:
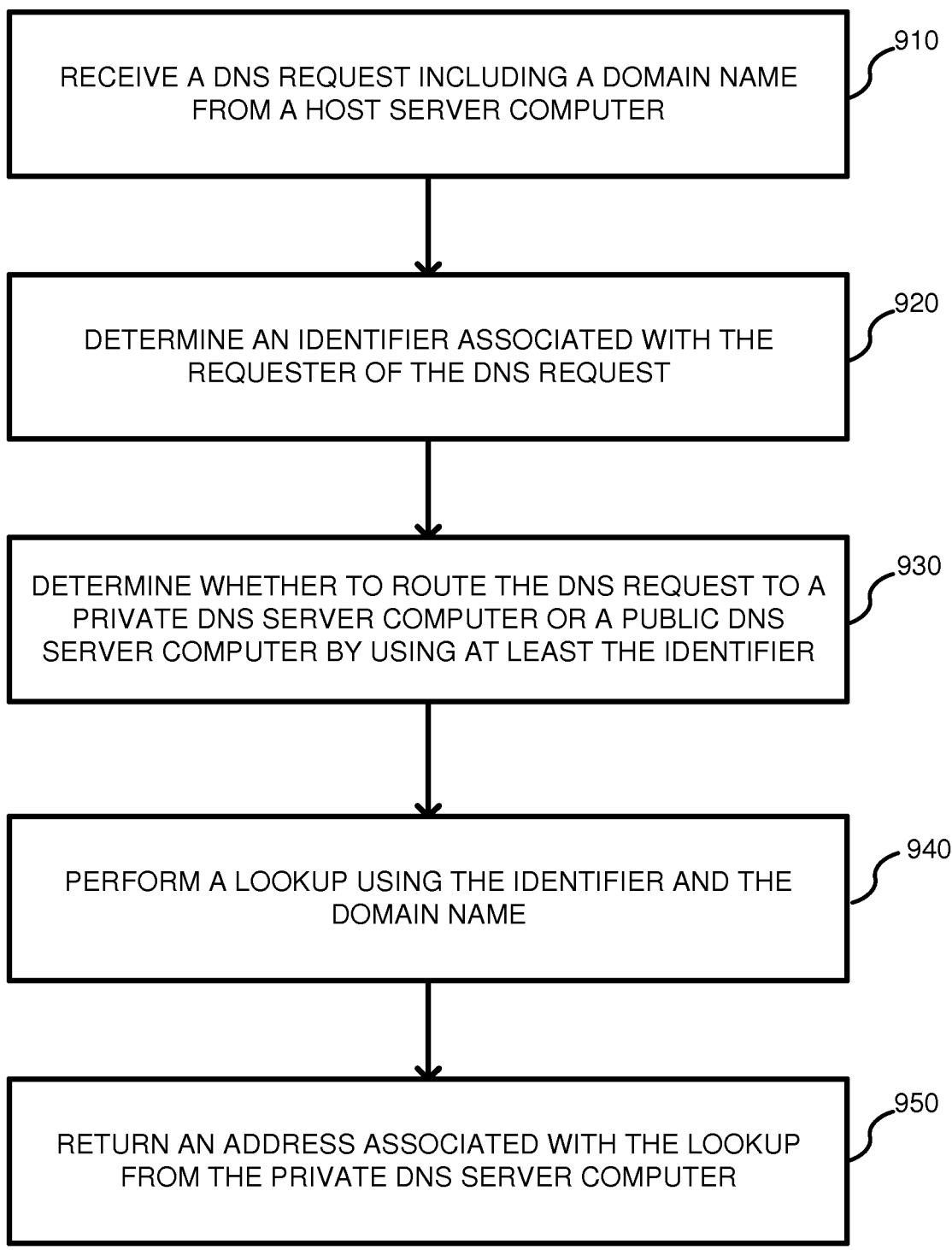
FIG. 9 is a flowchart according to another embodiment for routing DNS requests.

FIG. 9 is a flowchart according to another embodiment for selectively routing domain name requests. In process block 910, a DNS request is received from a host server computer. The request includes at least a domain name to be resolved. In process block 920, an identifier can be determined associated with the requester. The identifier can be included with the DNS request itself or it can be determined from the request, such as performing a lookup based on information within the request. In some embodiments, the identifier is a virtual network identifier that identifies a network from which the request originates. Furthermore, a geographic region can be determined. Like the identifier, the geographic region can be directly included in the request or determined from a lookup. For example, the identifier can be used as a key to lookup a region in which one or more host server computers are running a virtual network. The determination of the identifier can be performed by a different server computer than the determination of the geographic region. For example, the DNS classifier can determine the identifier, while the private DNS server can determine the geographic region. Alternatively, a single server computer can perform both lookups. In process block 930, a determination can be made whether to route the DNS request to a private DNS server computer or a public DNS server computer using at least the identifier to make the determination. In this case, the DNS classifier server can load a routing mapping table and perform a lookup in the routing mapping table using the identifier and the domain name. If a match is found, then the DNS classifier can route the DNS query to the private DNS server computer. The DNS classifier can also supplement the DNS query to include characteristics of the instance, such as an identifier of the instance, of the network where the instance is located, of a geographic region in which the instance is executing, and/or of a logical data center in which the instance is executing. As a result, a protocol between the DNS classifier and the private DNS server computer can include at least an identifier associated with the source of the request in addition to the domain name. In process block 940, a lookup is performed using the identifier and the domain name. The lookup can be performed by using a hashing algorithm or some other function to perform lookups. If a hashing algorithm is used, one or more of the identifier and domain name can be concatenated and used as inputs to the algorithm. In process block 950, based on the lookup, an address (e.g., an Internet Protocol (IP) address) can be returned as the DNS resolution.

In the event that the DNS request is forwarded to the public DNS server computer, it can be sent without sending the identifier. Instead, the public DNS server computer provides a same IP address with or without the identifier. Consequently, different responses are given to the DNS request depending on the identifier associated with the requester. For example, if the classifier determines using the identifier that the private DNS server computer should perform the lookup, then the domain name resolves to a different address than had the public DNS server computer performed the lookup. In the event that there is a conflict between the private and public DNS server computers, the private DNS server computer allows customers to override the public DNS server computers.

Figure 10:
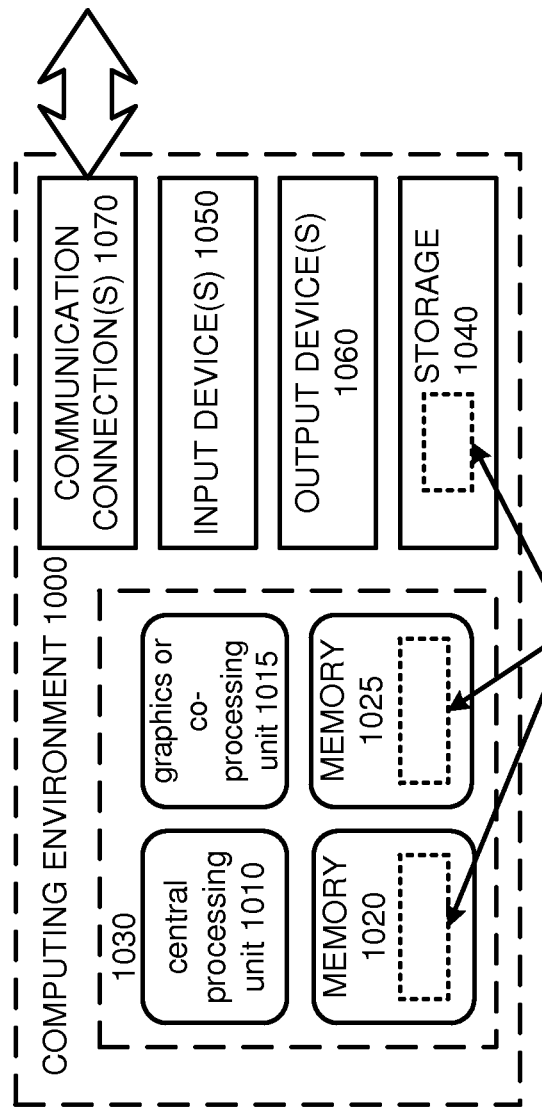
FIG. 10 depicts a generalized example of a suitable computing environment in which the described innovations may be implemented.

FIG. 10 depicts a generalized example of a suitable computing environment 1000 in which the described innovations may be implemented. The computing environment 1000 is not intended to suggest any limitation as to scope of use or functionality, as the innovations may be implemented in diverse general-purpose or special-purpose computing systems. For example, the computing environment 1000 can be any of a variety of computing devices (e.g., desktop computer, laptop computer, server computer, tablet computer, etc.).

With reference to FIG. 10, the computing environment 1000 includes one or more processing units 1010, 1015 and memory 1020, 1025. In FIG. 10, this basic configuration 1030 is included within a dashed line. The processing units 1010, 1015 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 10 shows a central processing unit 1010 as well as a graphics processing unit or co-processing unit 1015. The tangible memory 1020, 1025 may be volatile memory (e.g., registers, cache, RAM), non-volatile memory (e.g., ROM, EEPROM, flash memory, etc.), or some combination of the two, accessible by the processing unit(s). The memory 1020, 1025 stores software 1080 implementing one or more innovations described herein, in the form of computer-executable instructions suitable for execution by the processing unit(s).

A computing system may have additional features. For example, the computing environment 1000 includes storage 1040, one or more input devices 1050, one or more output devices 1060, and one or more communication connections 1070. An interconnection mechanism (not shown) such as a bus, controller, or network interconnects the components of the computing environment 1000. Typically, operating system software (not shown) provides an operating environment for other software executing in the computing environment 1000, and coordinates activities of the components of the computing environment 1000.

The tangible storage 1040 may be removable or non-removable, and includes magnetic disks, magnetic tapes or cassettes, CD-ROMs, DVDs, or any other medium which can be used to store information in a non-transitory way and which can be accessed within the computing environment 1000. The storage 1040 stores instructions for the software 1080 implementing one or more innovations described herein.

The input device(s) 1050 may be a touch input device such as a keyboard, mouse, pen, or trackball, a voice input device, a scanning device, or another device that provides input to the computing environment 1000. The output device(s) 1060 may be a display, printer, speaker, CD-writer, or another device that provides output from the computing environment 1000.

The communication connection(s) 1070 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

What is claimed is:

1. A method of selectively routing domain name system (DNS) requests, the method comprising:
   receiving, by an intermediate classifier server computer, a DNS request including a domain name and an identifier from a host server computer in a multi-tenant environment, the host server computer hosting a virtual network environment and the DNS request originating from the host server computer;
   extracting, by the intermediate classifier server computer, the identifier from the DNS request received from the host server computer, the identifier associated with a requester of the DNS request;
   determining, by the intermediate classifier server computer, whether to route the DNS request to a private DNS server computer in charge of private domain names or to a public DNS server computer in charge of public domain names by using at least the extracted identifier to search whether the domain name is within a mapping table for the private DNS;
   for a determination to route the DNS request to the private DNS server computer because the domain name is within the mapping table for the private DNS, performing a lookup using the identifier and the domain name; and
   returning an address associated with the lookup from the private DNS server computer to the host server computer in response to the DNS request,
   wherein determining whether to route the DNS request to the private DNS server computer or the public DNS server computer includes determining a logical data center that the DNS request originated.

2. The method of claim 1, wherein the address is a first address and further including: for a determination to route the DNS request to the public DNS server computer, performing a lookup by the public DNS server computer using the domain name, without using the identifier, and returning a second address different than the first address in response to the DNS request so that the DNS request has different responses depending on the identifier associated with the requester.

3. The method of claim 1, determining whether to route the DNS request to the private DNS server computer or the public DNS server computer includes determining whether the request was generated from a virtual private network executing within the multitenant environment.

4. The method of claim 3, wherein DNS requests generated from within the virtual private network resolve differently than DNS requests generated outside of the virtual private network.

5. The method of claim 1, wherein the requester is a virtual private network associated with a customer of the multi-tenant network.

6. A computer-readable storage medium including instructions that upon execution cause a computer system to:
   receive a Domain Name System (DNS) request in a classifier server computer of a service provider from an instance in a multi-tenant virtual network environment of the service provider, wherein the DNS originates from the instance and an identifier internal to the service provider is associated with the DNS request;
   determine whether to forward the DNS request from the classifier server computer to a private DNS server computer that resolves private domain names or forward the DNS request from the classifier server computer to a public DNS server computer that resolves publicly available domain names, wherein the determination includes searching, by the classifier server computer, whether a domain name and the identifier associated with the DNS request matches a stored domain name within a mapping table of domain names and a stored identifier within a mapping table of identifiers assessable by the classifier server computer;
   based on the searching, return an address associated with a selected one of the private DNS server computer or public DNS server computer;
   determine a logical data center within the service provider from which the DNS request originated, wherein the DNS request is resolved differently based on the determined logical data center; and
   based on the address, forward, by the classifier server computer, the DNS request to the selected one of the private DNS server computer or public DNS server computer to resolve the DNS request.

7. The computer-readable storage medium of claim 6, wherein the determination whether to forward the DNS request to a private or public DNS server computer is made based on whether the request was received from a host server computer within a virtual private network within the service provider.

8. The computer-readable storage medium according to claim 6, wherein instructions, upon execution, further cause the computer system to:
   using the private DNS server, determine a geographical region from which the DNS request originated and use the geographic region in conjunction with the identifier to perform a domain name resolution.

9. The computer-readable storage medium according to claim 6, wherein publicly available domain names are registered domain names with a domain name registrar independent of the service provider and the private domain names are not registered with the domain name registrar and are maintained by the service provider.

10. The computer-readable storage medium according to claim 6, wherein the instructions, upon execution, further cause the computer system to:
receive a customer request to configure a private DNS zone associated with a virtual network within the service provider;
associating the identifier with the virtual network;
determine that the DNS request is associated with the identifier; and
perform a lookup using the identifier as a key to determine whether the private DNS server computer should resolve the DNS request.

11. The computer-readable storage medium according to claim 6, wherein the instructions, upon execution, further cause the computer system to:
receive a customer API request that controls which of the private and public DNS server computers for which to route the DNS request.

12. The computer-readable storage medium according to claim 6, wherein the instructions, upon execution, further cause the computer system to:
associate multiple virtual networks with a DNS hosted zone and domain names within the DNS hosted zone so that requests from any of the multiple virtual networks are routed to the private DNS server.

13. The computer-readable storage medium according to claim 6, wherein the instructions, upon execution, further cause the computer system to:
override existing domain name resolutions that are implemented by the public DNS server computer using the private DNS server so that private domain names can conflict with publicly available domain names.

14. The computer-readable storage medium according to claim 6, wherein the forwarding of the DNS request to the private DNS server computer includes incorporating an identifier of a virtual network with the DNS request and forwarding the DNS request to the public DNS server computer does not include the identifier of the virtual network.

15. A system for resolving Domain Name System (DNS) requests, comprising:
a multi-tenant environment including multiple server computers at least some of which are adapted to be used to host a virtual network environment;
a DNS classifier that is configured to receive a DNS request originating from the virtual network environment of the multi-tenant environment, to perform a lookup using an identifier of the DNS request associated with the virtual network environment, and to forward the DNS request to either a public DNS server computer or a private DNS server computer, wherein the lookup includes determining whether the DNS request is associated with a domain name that is found in a mapping table and wherein the DNS classifier forwards the DNS request based on an address returned by the lookup; and
the private DNS server computer coupled to the DNS classifier and configured to resolve the DNS request using the identifier and a domain name associated with the DNS request,
wherein the private DNS server is configured to determine a logical data center within the multitenant environments from which the DNS request originated and resolve the DNS request differently based on the determined logical data center.

16. The system of claim 15, further including storage configured to store the mapping table, wherein the mapping table associates identifiers of virtual network environments within the multi-tenant environment with information indicating whether there is a private domain associated with the identifier, wherein the information includes at least the domain name.

17. The system of claim 15, wherein the DNS classifier and the private DNS server computer are configured to override existing domain name resolutions that are implemented by the public DNS server computer so that private domain names can conflict with publicly available domain names.

* * * * *